United States Patent
Sun et al.

(10) Patent No.: US 10,911,125 B2
(45) Date of Patent: Feb. 2, 2021

(54) COMMUNICATION METHOD, TERMINAL, AND BASE STATION

(71) Applicant: HUAWEI TECHNOLOGIES CO., LTD., Guangdong (CN)

(72) Inventors: Yanliang Sun, Shenzhen (CN); Kai Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/461,315

(22) PCT Filed: Apr. 12, 2018

(86) PCT No.: PCT/CN2018/082858
§ 371 (c)(1),
(2) Date: May 15, 2019

(87) PCT Pub. No.: WO2019/095620
PCT Pub. Date: May 23, 2019

(65) Prior Publication Data
US 2020/0274604 A1    Aug. 27, 2020

(30) Foreign Application Priority Data

Nov. 17, 2017   (CN) .......................... 2017 1 1149083

(51) Int. Cl.
*H04B 7/06*    (2006.01)
(52) U.S. Cl.
CPC ......... *H04B 7/0665* (2013.01); *H04B 7/0617* (2013.01)
(58) Field of Classification Search
CPC . H04L 27/2636; H04B 7/0456; H04B 7/0404; H04B 7/0478; H04B 7/0473;
(Continued)

(56) References Cited

U.S. PATENT DOCUMENTS

2011/0243079 A1    10/2011    Chen et al.
2011/0310994 A1*   12/2011    Ko ....................... H04B 7/0639
                                                              375/295
(Continued)

FOREIGN PATENT DOCUMENTS

CN    101510820 A    8/2009
CN    102142938 A    8/2011
(Continued)

OTHER PUBLICATIONS

Extended European Search Report issued in European Application No. 18874992.3 dated Oct. 14, 2019, 12 pages.

(Continued)

*Primary Examiner* — Rahel Guarino
(74) *Attorney, Agent, or Firm* — Fish & Richardson P.C.

(57) ABSTRACT

One example method includes receiving, by a terminal, indication information sent by a base station, where the indication information indicates a precoding matrix in a first precoding matrix set and a transmission rank corresponding to the precoding matrix, and the precoding matrix is used to precode transmit data streams at r transmission layers to obtain signals to be sent on N transmission ports of the terminal; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and determining, by the terminal based on the indication information, the precoding matrix for precoding the transmit data streams.

28 Claims, 4 Drawing Sheets

(58) Field of Classification Search
CPC .. H04B 7/0413; H04B 7/0665; H04B 7/0617; H04W 72/042; H04W 72/0473; H04W 72/0413; Y02D 70/1262
See application file for complete search history.

(56) References Cited

U.S. PATENT DOCUMENTS

| | | | |
|---|---|---|---|
| 2014/0029689 | A1 | 1/2014 | Liu et al. |
| 2016/0226567 | A1 | 8/2016 | Jia et al. |
| 2016/0323022 | A1 | 11/2016 | Rahman et al. |
| 2017/0195032 | A1 | 7/2017 | Huang et al. |

FOREIGN PATENT DOCUMENTS

| | | | |
|---|---|---|---|
| CN | 102938687 | A | 2/2013 |
| CN | 103782522 | A | 5/2014 |
| CN | 106341168 | A | 1/2017 |
| CN | 107148761 | A | 9/2017 |
| CN | 109803419 | A | 5/2019 |
| CN | 110366252 | A | 10/2019 |
| CN | 110708100 | A | 1/2020 |
| EP | 3528394 | A1 | 8/2019 |
| JP | 2011529660 | A | 12/2011 |
| JP | 2013038666 | A | 2/2013 |
| JP | 2013524615 | A | 6/2013 |
| WO | 2007051154 | A2 | 5/2007 |
| WO | 2009091307 | A1 | 7/2009 |
| WO | 2018117738 | A1 | 6/2018 |

OTHER PUBLICATIONS

Office Action issued in Chinese Application No. 201880004011.3 dated Apr. 20, 2020, 12 pages (with English translation).
R1-1718425—Ericsson, "Codebook Based UL MIMO," 3GPP TSG-RAN WG1 #90bis, Prague, Czech Republic, Oct. 9-13, 2017, 13 pages.
R1-1716785—MediaTek Inc., "Codebook based transmission for UL," 3GPP TSG RAN WG1 Meeting NR#3, Nagoya, Japan, Sep. 18-21, 2017, 2 pages.
R1-1718336—MediaTek Inc., "Codebook based transmission for UL," 3GPP TSG RAN WG1 Meeting #90bis, Prague, Czech. 9-13, 2017, 11 pages.
R1-090377—Ericsson, "Uplink SU-MIMO in LTE—Advanced," 3GPP TSG-RAN WG1 #55bis, Ljubljana, Slovenia, Jan. 12-16, 2009, 10 pages.
R1-092402—Texas Instruments, "4Tx Codebook for UL SU-MIMO: Rank-1 and 2," 3GPP TSG RAN WG1 57bis, Los Angeles, USA, Jun. 29-Jul. 3, 2009, 7 pages.

R1-092068—Qualcomm Europe, "Precoding Design for LTE—A Uplink MIMO Operation," 3GPP TSG-RAN WG1 #57, / San Francisco, USA, May 4-8, 2009, 16 pages.
R1-090327—Motorola, "UL-MIMO with Antenna Gain Imbalance," TSG-RAN WG1 #55bis, Ljubljana, Slovenia, Jan. 12-16, 2009, 6 pages.
R1-1718897—LG Electronics et al., "WF on 4Tx UL codebook for DFTs-OFDM," 3GPP TSG RAN WG1 Meeting RAN1#90bis, Prague, Czech Republic, Oct. 9-13, 2017, 3 pages.
R1-092420—Research in Motion, UK Limited, "Type-II Relay DL/UL Transmission Schemes," 3GPP TSG RAN WG1 Meeting #57bis, Los Angeles, USA, Jun. 29-Jul. 3, 2009, 8 pages.
R1-1709232,—Samsung et al., "WF on Type I and II CSI codebooks," 3GPP TSG-RAN WG1 #89, Hangzhou, China, May 15-19, 2017, 24 pages.
R1-1715584—Huawei, HiSilicon, "Codebook based transmission for UL MIMO," 3GPP TSG RAN WG1 NR Ad-Hoc#3, Nagoya, Japan, Sep. 18-21, 2017, 10 pages.
R1-1719301—MCC Support, "Final Report of 3GPP TSG RAN WG1 #90bis v1.0.0," 3GPP TSG RAN WG1 Meeting #91, Reno, USA, Nov. 27-Dec. 1, 2017, 206 pages.
3GPP TS 38.211 V1.0.0 (Sep. 2017), "3rd Generation Partnership Project;Technical Specification Group Radio Access Network; NR; Physical channels and modulation (Release 15)," Technical Specification, Sep. 2017, 37 pages.
3GPP TS 38.212 V1.0.0 (Sep. 2017), "3rd Generation Partnership Project; Technical Specification Group Radio Access Network; NR; Multiplexing and channel coding (Release 15)," Technical Specification, Sep. 2017, 28 pages.
3GPP TS 38.214 V1.0.0 (Sep. 2017), "3rd Generation Partnership Project; Technical Specification Group Radio Access Network; NR; Physical layer procedures for data (Release 15)," Technical Specification, Sep. 2017, 32 pages.
PCT International Search Report and Written Opinion issued in International Application No. PCT/CN2018/082858 dated Aug. 1, 2018, 12 pages (partial English translation).
Office Action issued in Chinese Application No. 201910379868.X dated May 7, 2020, 11 pages (with English translation).
EPO Communication pursuant to Article 94(3) EPC issued in European Application No. 18874992.3 dated Aug. 25, 2020, 9 pages.
MediaTek Inc., "Discussion on Must Case 3," 3GPP TSG-RAN WG4 Meeting #83, R4-1704734, Hangzhou, China, May 15-19, 2017, 6 pages.
Huawei, HiSilicon, "Codebook based transmission for UL MIMO," 3GPP TSG RAN WG1 Meeting #90bis, R1-1718237, Prague, Czech Republic, Oct. 9-13, 2017, 10 pages.
Office Action issued in Japanese Application No. 2019-528060 dated Sep. 23, 2020, 9 pages (with English translation).
Office Action issued in Indian Application No. 201937017003 dated Nov. 4, 2020, 7 pages.

\* cited by examiner

COMMUNICATION METHOD, TERMINAL, AND BASE STATION

CROSS-REFERENCE TO RELATED APPLICATIONS

This application is a national stage of International Application No. PCT/CN2018/082858, filed on Apr. 12, 2018, which claims priority to Chinese Patent Application No. 201711149083.0, filed on Nov. 17, 2017. Both of the aforementioned applications are hereby incorporated by reference in their entireties.

TECHNICAL FIELD

This application relates to the field of mobile communications technologies, and in particular, to a communication method, a terminal, and a base station.

BACKGROUND

In discussions of the 3rd Generation Partnership Project (3rd generation partnership project, 3GPP) New Radio (New Radio access technology, NR), it is determined that uplink multi-antenna transmission is currently supported. A mechanism for uplink multi-antenna transmission is similar to that for downlink multi-antenna transmission. A terminal first sends a sounding reference signal (sounding reference signal, SRS), and a base station receives the SRS, learns an uplink channel status through channel estimation, and further schedules uplink transmission by sending downlink control information (downlink control information, DCI). Based on a conclusion of the current NR discussions, a maximum of four uplink SRS ports can be supported. In addition, considering codebook-based uplink transmission, when instructing the terminal to perform uplink transmission, the base station may indicate a precoding matrix for uplink multi-antenna transmission by using a predefined codebook. Specifically, the codebook includes N available precoding matrices. The base station selects one of the N precoding matrices based on the SRS sent by the terminal, determines the precoding matrix as a precoding matrix that needs to be used on the SRS ports, and sends a precoding matrix indication (transmit precoding matrix indication, TPMI) to indicate the precoding matrix that needs to be used on the SRS ports. After receiving the DCI for uplink scheduling, the terminal learns, by reading a TPMI indication bit, the precoding matrix that needs to be used for uplink transmission.

In LTE-A (long term evolution-advanced), an uplink codebook using a single carrier transform spread wavelength division multiplexing (discrete fourier transform spread orthogonal frequency divided multiplexing, DFT-S-OFDM) waveform is greatly limited by a low peak-to-average ratio of the DFT-S-OFDM single carrier waveform. To meet a requirement of the low peak-to-average ratio, precoding matrix spacings between precoding matrices whose ranks are greater than 1 are non-uniform. When a rank is greater than 1, a cyclic prefixed wavelength division multiplexing (cyclic prefixed orthogonal frequency divided multiplexing, CP-OFDM) waveform is determined for use in NR uplink transmission. Therefore, the uplink codebook is not limited by the low peak-to-average ratio. In this case, directly using an LTE-A precoding matrix whose rank is greater than 1 degrades performance. In view of this, the uplink codebook is improved. A plurality of port groups are considered, and the precoding matrix uplink codebook is designed based on different port groups. There are a total of 64 or 128 precoding matrices whose ranks are 1, and there are also 64 or 128 precoding matrices whose ranks are 2. The uplink codebook is designed to be extremely large, and generating a precoding matrix based on different port groups makes the standard more complex, makes implementation more complex, and increases overheads. Therefore, the design is not an optimal solution.

In conclusion, a simplified universal codebook needs to be designed for a requirement of determining to use the CP-OFDM waveform in NR uplink transmission when a rank is greater than 1.

SUMMARY

This application provides a communication method, a terminal, and a base station, to meet the foregoing requirement.

According to a first aspect, this application provides a communication method, where the method includes:

receiving, by a terminal, indication information sent by a base station, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, $1 \leq r \leq N$, and a value of the transmission rank is equal to the quantity r of transmission layers; and when $r>1$, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and determining, by the terminal based on the indication information, the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of 1, −1, j, and −j.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

According to a second aspect, this application provides a communication method, including: determining, by a base station, indication information, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, $1 \leq r \leq N$, and a value of the transmission rank is equal to the quantity r of transmission layers; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and sending, by the base station, the indication information to the terminal, where the indication information is used by the terminal to determine the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of $1, -1, j$, and $-j$.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

According to a third aspect, this application provides a terminal, including a processor and a communications interface. The processor is configured to support a base station in performing a corresponding base station function in the foregoing method. The communications interface is configured to support communication between the terminal and the base station, so as to send information or an instruction used in the foregoing method to the base station. The terminal may further include a memory. The memory is configured to be coupled to the processor and store a program instruction and data that are necessary for the base station.

The communications interface is configured to receive indication information from the base station, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, $1 \leq r \leq N$, and a value of the transmission rank is equal to the quantity r of transmission layers; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and the processor is configured to determine, based on the indication information, the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of 1, −1, j, and −j.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

According to a fourth aspect, this application provides a base station, including a processor and a communications interface. The processor is configured to support the base station in performing a corresponding base station function in the foregoing method. The communications interface is configured to support communication between the base station and a terminal, so as to send information or an instruction used in the foregoing method to the terminal. The base station may further include a memory. The memory is configured to be coupled to the processor and store a program instruction and data that are necessary for the base station.

The processor is configured to determine indication information, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, $1 \leq r \leq N$, and a value of the transmission rank is equal to the quantity r of transmission layers; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and the communications interface is configured to send the indication information to the terminal, where the indication information is used by the terminal to determine the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of 1, −1, j, and −j.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

According to a fifth aspect, to achieve the foregoing invention purpose, this application provides a circuit system, where the circuit system includes an interface unit, a control and operation unit, and a storage unit. The interface unit is configured to connect to another component of a base station or a terminal, the storage unit is configured to store a computer program or an instruction, and the control and operation unit is configured to decode and execute the computer program or the instruction. The computer program or the instruction is executed to implement any one of the first aspect and the possible implementations of the first aspect, or implement any one of the second aspect and the possible implementations of the second aspect.

DESCRIPTION OF EMBODIMENTS

The following further describes this application in detail with reference to the accompanying drawings.

The following describes a system operating environment of this application. A technology described in this application is applicable to an LTE system, such as an LTE/LTE-A/eLTE system, or another wireless communications system that uses various wireless access technologies, such as a system that uses the following access technologies: Code Division Multiple Access (code division multiple access, CDMA), Frequency Division Multiple Access (frequency division multiple access, FDMA), Time Division Multiple Access (time division multiple access, TDMA), orthogonal frequency division multiple access (orthogonal frequency division multiple access, OFDMA), a single carrier frequency division multiple access (single carrier-frequency division multiple access, SC-FDMA), and the like, is further applicable to a subsequent evolved system, such as the fifth generation 5G (which may also referred to as a new radio (new radio, NR)) system, and is also applicable to a similar wireless communications system, such as cellular systems related to WiFi, WiMAX, and 3GPP.

Figure 1:
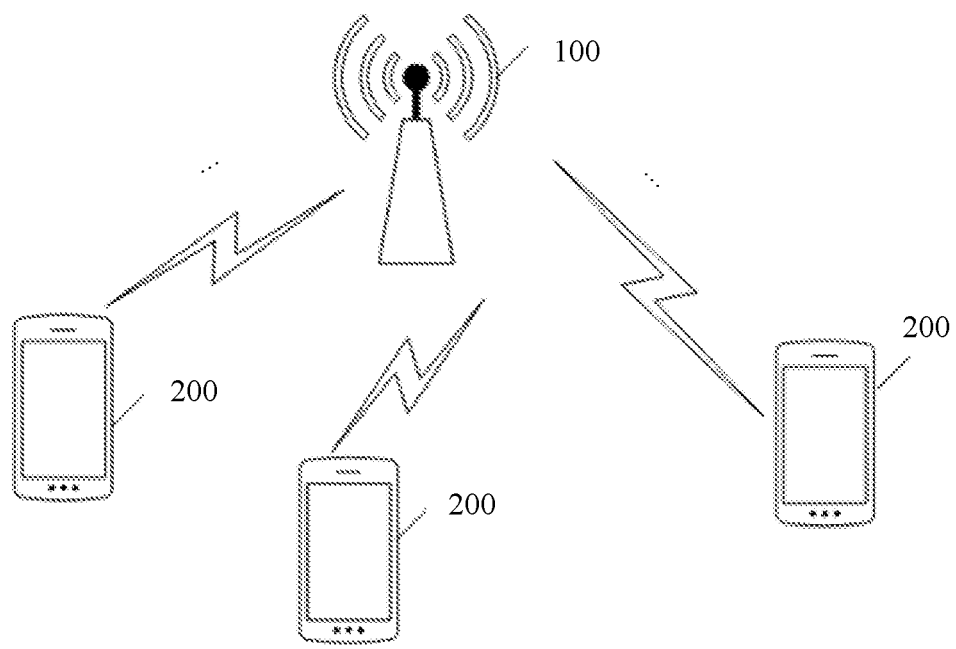
FIG. 1 is a schematic architectural diagram of a wireless communications system according to this application.

FIG. 1 provides a schematic diagram of a communications system. The communications system may include at least one base station 100 (only one base station is shown) and one or more terminals 200 connected to the base station 100.

The base station 100 may be a device that can communicate with the terminal 200. The base station 100 may be any device with a wireless transceiving function, and includes but is not limited to a NodeB NodeB, an evolved NodeB eNodeB, a base station in a fifth generation (the fifth generation, 5G) communications system, a base station or a base station in a future communications system, an access node in a WiFi system, a wireless relay node, a wireless backhaul node, and the like. Alternatively, the base station 100 may be a radio controller in a cloud radio access network (cloud radio access network, CRAN) scenario. The base station 100 may be a base station in a 5G network or a base station in a future evolved network, or may be a wearable device or an in-vehicle device. The base station 100 may be a small cell, a transmission node (transmission reference point, TRP), or the like. Certainly, this is not limited in this application.

The terminal 200 is a device with a wireless transceiving function, and may be deployed on land, where the device deployed on land includes an indoor, outdoor, handheld, wearable, or in-vehicle device, or may be deployed on a water surface (for example, on a steamboat), or may be deployed in the air (for example, on a plane, a balloon, or a satellite). The terminal may be a mobile phone (mobile phone), a tablet computer (Pad), a computer with a wireless transceiving function, a virtual reality (virtual reality, VR) terminal, an augmented reality (augmented reality, AR) terminal, a wireless terminal in industrial control (industrial control), a wireless terminal in self-driving (self driving), a wireless terminal in remote medical treatment (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. The terminal sometimes may also be referred to as user equipment (user equipment, UE), an access terminal, a UE unit, a UE station, a mobile station, a mobile station, a remote station, a remote terminal, a mobile device, a UE terminal, a terminal, a wireless communications device, a UE agent, a UE apparatus, or the like.

It should be noted that, the terms "system" and "network" may be used interchangeably in the embodiments of the present invention. "A plurality of" means two or more than two. Based on this, "a plurality of" in the embodiments of the present invention may be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise. In this application, "TPMI" and "precoding matrix sequence number" may be used interchangeably, "TRI" and "quantity of transmission ranks" may be used interchangeably, "transmission rank" and "rank" may be used interchangeably, and "transmit data stream" and "transmission data stream" may be used interchangeably.

A multiple-input multiple-output (multiple-input multiple-output, MIMO) technology uses multiple antennas to concurrently send a plurality of paths of data, so as to obtain an extra spatial multiplexing gain. To better use a complex channel spatial characteristic, a transmit data stream is usually precoded, and a signal is pre-processed at a transmit end by using channel state information, so as to improve signal transmission quality.

In a precoding technology, a receive vector may be represented as y=HWx+n, where H represents a space channel matrix, W is a precoding matrix, x is a transmit signal vector, and n is a noise vector. The precoding matrix W is an I×$N_{layer}$ matrix. I is a quantity of transmission ports, and $N_{layer}$ is a quantity of symbol streams, and is usually referred to as a transmission rank or a quantity of transmission layers. The precoding matrix W can be used to precode data streams on the $N_{layer}$ transmission layers, and map the data streams to the I transmission ports, and $N_{layer} \leq I$. W is usually selected based on one codebook, in other words, one precoding matrix set. The codebook is recorded in a communication standard, and is known by both a reception party and a transmission party in wireless communication. An index of a matrix in the codebook is indicated in signaling, to indicate precoding matrix information corresponding to the reception party or the transmission party. Generally, in multi-antenna wireless communication, the precoding matrix W is selected, so that a multi-antenna channel capacity can be maximized, or a bit error rate can be minimized based on a demodulation algorithm.

An uplink MIMO technology is introduced in LTE-A. In an LTE-A uplink MIMO system, two or four transmission ports may be configured for the terminal. In LTE-A uplink data transmission, the data stream is precoded by using a single codebook.

Figure 2:
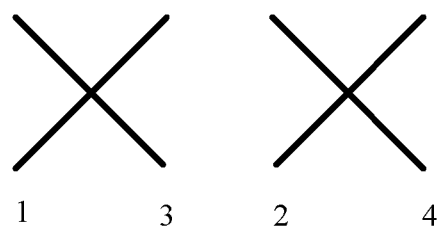
FIG. 2 is a schematic structural diagram of a dual-polarized antenna pair assumption according to this application.

FIG. 2 is a four-transmission-port dual-polarized array of a terminal. A port 1 and a port 3 belong to a same dual-polarized antenna pair, and a port 2 and a port 4 belong to a same dual-polarized antenna pair. The port 1 and the port 2 represent a same polarization direction, and the port 3 and the port 4 represent a same polarization direction.

Based on the dual-polarized array shown in FIG. 2, a design rule of an uplink codebook that uses a DFT-S-OFDM waveform and that is applied to LTE-A is as follows:

When there is one transmission data stream, that is, a rank is 1, precoding matrices used for port combination, specifically, precoding matrices corresponding to sequence numbers 0 to 15 in Table 1, is generated based on mutually unbiased bases (mutually unbiased bases, MUB) in four-dimensional complex space. Specifically, precoding matrices whose sequence numbers are 0, 2, 8, and 10 correspond to one orthogonal basis, and precoding matrices whose sequence numbers are 1, 3, 9, and 11 correspond to one orthogonal basis, precoding matrices whose sequence numbers are 4, 6, 12, and 14 correspond to one orthogonal basis, and precoding matrices whose sequence numbers are 5, 7, 13, and 15 correspond to one orthogonal basis. Precoding matrices corresponding to sequence numbers 16 to 23 in Table 1 indicate the following function: When any dual-polarized antenna pair is blocked, a corresponding port may be disabled. In this case, transmit power of the port is 0.

When there are two transmission data streams, that is, a rank is 2, to maintain a single carrier characteristic, precoding corresponding to each transmission layer is not generated by using a precoding matrix used for four-port combination, but instead, two corresponding transmission ports are selected for each transmission data stream, and it is ensured that any port is not used for the two data streams. Specifically, when two transmission layers respectively correspond to two beams with different polarization directions, a dual-polarized antenna pair combination manner in which the port 1 and the port 2 are combined into one port group, and the port 3 and the port 4 are combined into another port group is used, beam quantization corresponding to a binary phase shift keying (Binary Phase Shift Keying, BPSK) phase is defined, a quadrature phase shift keying (Quadri Phase Shift Keying, QPSK) phase is used, and eight precoding matrices are used, to obtain precoding matrices corresponding to sequence numbers 0 to 7 in Table 2. Correspondingly, a dual-polarized antenna pair combination manner in which the port 1 and the port 3 are combined into one port group, and the port 2 and the port 4 are combined into another port group is used, to obtain precoding matrices corresponding to sequence numbers 8 to 11 in Table 2. Correspondingly, a dual-polarized antenna pair combination manner in which the port 1 and the port 4 are combined into one port group, and the port 2 and the port 3 are combined into another port group is used, to obtain precoding matrices corresponding to sequence numbers 12 to 15 in Table 2.

When there are three transmission data streams, that is, a rank is 3, to maintain a single carrier characteristic, a similar rule is used: A corresponding transmission port is selected for each transmission data stream, and it is ensured that any port is not used for two data streams. Considering that sorting of transmission data streams does not affect a decoding characteristic, only a case in which two transmission ports are selected and used for a first data stream (in other words, a first column of a precoding matrix) is designed. In addition, only a BPSK phase is used considering that no large gain is obtained through more accurate port combination when the rank is 3.

When there are four transmission data streams, that is, a rank is 4, each transmission data stream corresponds to only one transmission port.

Based on DFT-S-OFDM, for the design of the LTE-A uplink codebook in the case of one transmission data stream, refer to Table 1, for the design of the LTE-A uplink codebook in the case of two transmission data streams, refer to Table 2, for the design of the LTE-A uplink codebook in the case of three transmission data streams, refer to Table 3, and for the design of the LTE-A uplink codebook in the case of four transmission data streams, refer to Table 4.

TABLE 1

| Precoding matrix sequence number | One transmission data stream |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\-j\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-1\end{bmatrix}$ $\frac{1}{2}\begin{bmatrix}1\\-j\\j\\-1\end{bmatrix}$ $\frac{1}{2}\begin{bmatrix}1\\-j\\-1\\-1\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\1\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

TABLE 2

| Precoding matrix sequence number | Two transmission data streams |
|---|---|
| 0-3 | $\frac{1}{2}\begin{bmatrix}1&0\\1&0\\0&1\\0&-j\end{bmatrix}$ $\frac{1}{2}\begin{bmatrix}1&0\\1&0\\0&1\\0&j\end{bmatrix}$ $\frac{1}{2}\begin{bmatrix}1&0\\-j&0\\0&1\\0&1\end{bmatrix}$ $\frac{1}{2}\begin{bmatrix}1&0\\-j&0\\0&1\\0&-1\end{bmatrix}$ |
| 4-7 | $\frac{1}{2}\begin{bmatrix}1&0\\-1&0\\0&1\\0&-j\end{bmatrix}$ $\frac{1}{2}\begin{bmatrix}1&0\\-1&0\\0&1\\0&j\end{bmatrix}$ $\frac{1}{2}\begin{bmatrix}1&0\\j&0\\0&1\\0&1\end{bmatrix}$ $\frac{1}{2}\begin{bmatrix}1&0\\j&0\\0&1\\0&-1\end{bmatrix}$ |
| 8-11 | $\frac{1}{2}\begin{bmatrix}1&0\\0&1\\1&0\\0&1\end{bmatrix}$ $\frac{1}{2}\begin{bmatrix}1&0\\0&1\\1&0\\0&-1\end{bmatrix}$ $\frac{1}{2}\begin{bmatrix}1&0\\0&1\\-1&0\\0&1\end{bmatrix}$ $\frac{1}{2}\begin{bmatrix}1&0\\0&1\\-1&0\\0&-1\end{bmatrix}$ |
| 12-15 | $\frac{1}{2}\begin{bmatrix}1&0\\0&1\\0&1\\1&0\end{bmatrix}$ $\frac{1}{2}\begin{bmatrix}1&0\\0&1\\0&-1\\1&0\end{bmatrix}$ $\frac{1}{2}\begin{bmatrix}1&0\\0&1\\0&1\\-1&0\end{bmatrix}$ $\frac{1}{2}\begin{bmatrix}1&0\\0&1\\0&-1\\-1&0\end{bmatrix}$ |

TABLE 3

| Precoding matrix sequence number | Three transmission data streams |
|---|---|
| 0-3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| 4-7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |
| 8-11 | $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ $\frac{1}{2}\begin{bmatrix}0&1&0\\0&0&1\\1&0&0\\1&0&0\end{bmatrix}$ $\frac{1}{2}\begin{bmatrix}0&1&0\\0&0&1\\1&0&0\\-1&0&0\end{bmatrix}$ |

TABLE 4

| Precoding matrix sequence number | Four transmission data streams |
|---|---|
| 0 | $\frac{1}{2}\begin{bmatrix}1&0&0&0\\0&1&0&0\\0&0&1&0\\0&0&0&1\end{bmatrix}$ |

The design of the LTE-A uplink codebook is greatly limited by a low peak-to-average ratio of the DFT-S-OFDM single carrier waveform. To meet a requirement of the low peak-to-average ratio, when the rank is greater than 1, some precoding matrix spacings are sacrificed, in other words, uniformity and density of performing sampling on the precoding matrix in the Grassmannian (Grassmannian) G(4, n) complex space are sacrificed. When the rank is greater than 1, a CP-OFDM waveform is determined for use in NR uplink transmission. Therefore, the uplink codebook is not limited by the low peak-to-average ratio. In this case, directly using an LTE-A precoding matrix whose rank is greater than 1 degrades performance.

Based on the dual-polarized array shown in FIG. 2, a design rule of an uplink codebook that uses a DFT-S-OFDM waveform and that is applied to NR is as follows:

For a non-uniform linear array (uniform linear array, ULA), a precoding matrix whose rank is greater than 1 is constructed based on an MUB basis used by a precoding matrix whose rank is 1 in an LTE-A codebook. If a spatial chordal distance (chordal distance) between two precoding matrices is 0, both the precoding matrices do not need to be put into the codebook. Based on the design rule, an 8PSK phase-based large codebook may be obtained, where an existing codebook can be considered as a subset of the large codebook. In the codebook, there are a total of 64 or 128 precoding matrices whose ranks are 1, and there are also 64 or 128 precoding matrices whose ranks are 2. A different codebook subset may be configured for each user through configuration of a codebook restriction set (code book subset restriction, CBSR), so that overheads of TPMI indication signaling in downlink control information (downlink control information, DCI) can be reduced.

However, the uplink codebook is designed to be extremely large. It may be unsuitable to apply 8PSK for a terminal with a low modulation capability. In addition, a plurality of port groups are considered in a codebook design of the MTK, and a precoding matrix is generated based on different port groups. However, actually ports can be sorted through antenna port re-explanation during implementation. There are many similar redundant designs. The large codebook generated based on the design rule makes the standard more complex. The design seems to make implementation more flexible, but actually makes the implementation more complex and increases overheads. Therefore, the design is not an optimal solution. For example, in the design, a codebook subset needs to be configured based on a CBSR, and RRC configuration overheads are unavoidable in addition to the redundant designs.

In view of disadvantages of the foregoing two uplink codebook designs, this application provides a design of an uplink codebook that uses a CP-OFDM waveform and that is applied to NR, so as to design a simplified universal codebook. A design idea of the uplink codebook provided in this application is as follows:

This application first provides the following related explanations of the dual-polarized antenna pair shown in FIG. 2.

Based on consideration of an antenna array element corresponding to a transmission port, as shown in FIG. 2, the port 1 and the port 2 may be considered as antenna array elements or transmit antenna array elements (transmit radio frequency unit, TXRU) with a same polarization direction or similar polarization directions, and the port 3 and the port 4 may be considered as antenna array elements or TXRUs with a same polarization direction or similar polarization directions. In this case, the port 1 and the port 2 generate digital beams corresponding to a first polarization direction, and the port 3 and the port 4 generate digital beams corresponding to a second polarization direction. Based on such an understanding, orthogonal bases corresponding to a precoding matrix set {0, 2, 8, 10} and a precoding matrix set {5, 7, 13, 15} are a case in which digital beams corresponding to two co-polarization direction port groups are orthogonal, and orthogonal bases corresponding to a precoding matrix set {1, 3, 9, 11} and a precoding matrix set {4, 6, 12, 14} are a case in which digital beams corresponding to two co-polarization direction port groups are the same. The dual-polarized array assumption shown in FIG. 2 is actually a general assumption. This point is mainly described below. First, any wireless communications system needs to have a capability of sending/receiving electromagnetic waves in two polarization directions, but any antenna or TXRU can send/receive only one polarization direction. Therefore, especially for a transmit end, when a quantity of antenna array elements is greater than or equal to 2, using a dual-polarized antenna to send a signal is likely to achieve a better effect in a general random channel condition. When there are four antenna array elements, two dual-polarized antenna pairs are usually used to send a signal in a general random channel condition. Regardless of how large a spacing between two dual-polarized antenna pairs is and how strong a correlation between two dual-polarized antenna pairs is, a specific phase coefficient can be found for one pair of antennas with a same polarization direction or similar polarization directions at a frequency or in a channel condition. It may be considered that two polarized antenna pairs are combined by using a phase coefficient. Therefore, the dual-polarized array is common, but is not an antenna form corresponding to specific UE. Second, port sorting shown in FIG. 2 is general for any dual-polarized antenna pair. During implementation, each terminal manufacturer may send, by default, a reference signal based on the port sorting shown in FIG. 2.

This application then provides related explanations of a precoding matrix with reference to related content of the dual-polarized antenna pair.

Specifically, an N-port precoding matrix whose rank is r may be used to perform precoding at R data transmission layers and obtain uplink sending signals on N antenna ports. In other words, each column of the precoding matrix corresponds to one data stream, and each row of the precoding matrix corresponds to one antenna port. A rank of the precoding matrix, in other words, a quantity of columns, is a quantity of spatial multiplexing data streams. A quantity of ports of the precoding matrix, in other words, a quantity of rows, is a quantity of antenna ports for signal sending. The antenna port is an abstract concept, and may correspond to a specific physical antenna, or may correspond to a beam (usually also referred to as a virtual antenna) obtained through beamforming.

Based on this, any precoding matrix P may be written in the following form:

$$P = \eta A = \eta \begin{bmatrix} \alpha_{11} & \alpha_{12} & \dots & \alpha_{1R} \\ \alpha_{21} & \alpha_{22} & \dots & \alpha_{2R} \\ \dots & \dots & \dots & \dots \\ \alpha_{N1} & \alpha_{N2} & \dots & \alpha_{NR} \end{bmatrix},$$

where $\eta$ is a scalar part of the precoding matrix, A is a nonscalar part of the precoding matrix, and each element $\alpha_{nr}$ in the precoding matrix can be only 0 or a complex number whose modulus is 1, where n=1, 2, . . . , N, r=1, 2, . . . , R.

Generally, when N=4, four ports for uplink transmission may be considered as two port groups, and each port group corresponds to one dual-polarized antenna pair or one pair of two beams with a same beam direction but different polarization directions. For example, assuming that the four antenna ports are numbered successively 1, 2, 3, and 4, in the design of the LTE uplink codebook, a port 1 and a port 3 correspond to a same port group, and a port 2 and a port 4 correspond to a same port group. Generally, the port 1 and the port 2 have a same polarization direction, and beamforming may be performed by generating a transmit phase difference; and the port 3 and the port 4 have a same polarization direction, and beamforming may be performed by generating a transmit phase difference. In this case, in a nonscalar part of a four-port precoding matrix, each column actually indicates beam information separately corresponding to two polarization directions in precoding corresponding to a transmission layer, in other words, indicates beam space of the four ports. If for a column, a transmit phase difference corresponding to the port 1 and the port 2 is the same as a transmit phase difference corresponding to the port 3 and the port 4, same beam space exists. If for a column, a transmit phase difference corresponding to the port 1 and the port 2 is opposite to a transmit phase difference corresponding to the port 3 and the port 4, opposite beam space exists. If for two columns, transmit phase differences corresponding to the port 1 and the port 2 are the same, and transmit phase differences corresponding to the port 3 and the port 4 are also the same, the two columns have completely same beam space. If for two columns, transmit phase differences corresponding to the port 1 and the port 2 are opposite, and transmit phase differences corresponding to the port 3 and the port 4 are also opposite, the two columns have completely opposite beam space. Based on this, a transmit phase difference between the port 1 and the port 3 is actually a phase difference between respective beams in the two polarization directions, and is usually referred to as a cross-polarization phase.

For example, for a precoding matrix 0 in Table 1, beam space corresponding to two dual-polarized antenna pairs is opposite, beam space corresponding to a port group that includes the port 1 and the port 2 is [1, 1], beam space corresponding to a port group that includes the port 3 and the port 4 is [1, −1], and a cross-polarization phase of the two port groups is [1, 1]. For another example, for a precoding matrix 6 in Table 1, beam space corresponding to two dual-polarized antenna pairs is the same, both beam space corresponding to a port group that includes the port 1 and the port 2 and beam space corresponding to a port group that includes the port 3 and the port 4 are [1, j], and a corresponding cross-polarization phase is [1, −1].

In addition, a 2-norm $\|a\|_2$ of a vector a is defined as follows (a may be a row vector or a column vector, where an example in which a is a column vector is used below, a row vector calculation method is completely consistent with a column vector calculation method, and N is a quantity of elements included in a):

$$\|a\|_2 = \left\| \begin{bmatrix} a_1 \\ a_2 \\ \ldots \\ a_N \end{bmatrix} \right\|_2 = \sqrt{a_1^2 + a_2^2 + \ldots + a_N^2}$$

Then universal application scenarios of four transmission ports (to be specific, the four antenna ports corresponding to the dual-polarized antenna pair in FIG. 2) for a terminal are analyzed as follows:

Scenario 1: Coherent transmission can be performed between the four transmission ports.

Scenario 2: The four transmission ports may be classified into two groups, and coherent transmission can be performed in the group, but coherent transmission cannot be performed between the groups.

Scenario 3: Only incoherent transmission can be performed between the four transmission ports, in other words, coherent transmission cannot be performed between the four transmission ports.

Based on the foregoing analysis and assumption, rules for designing an uplink codebook in this application are summarized as follows:

First, to ensure that multi-antenna precoding of the terminal is not affected by waveform switching when the rank is 1, in this application, a precoding matrix in the case of the DFT-S-OFDM waveform is still used as a precoding matrix whose rank is 1 in the case of the CP-OFDM waveform. For details, refer to Table 5.

Second, to make implementation of the terminal less complex, a nonscalar part of each precoding matrix whose rank is greater than 1 is obtained by combining nonscalar parts of precoding matrices whose ranks are 1.

Third, precoding matrix characteristics corresponding to the scenarios are described as follows: A precoding matrix characteristic corresponding to Scenario 1 is as follows: Any column of any precoding matrix whose rank is greater than 1 includes a maximum of four non-zero elements. A precoding matrix characteristic corresponding to Scenario 2 is as follows: Any vector of any precoding matrix whose rank is greater than 1 includes a maximum of two non-zero elements. A precoding matrix characteristic corresponding to Scenario 3 is as follows: Any vector of any precoding matrix whose rank is greater than 1 includes a maximum of one non-zero element.

Based on the current port groups and assumption, precoding matrices are separately designed for a coherent scenario, a partially coherent scenario, and an incoherent scenario. Designed codebooks are universal, and a quantity of precoding matrices may be minimized, so that system transmission performance can be optimized in a limitation condition that a quantity of indication bits needs to be less than six during hybrid coding of a TPMI and a TRI in control signaling.

In addition, for the four transmission ports, this application further provides a corresponding solution to a problem caused by antenna gain imbalance (Antenna Gain Imbalance, AGI) because of blockage (for example, some transmission ports may be blocked by a hand of a user): A precoding matrix with a function of instructing to disable some radio frequency links is added to precoding matrices whose ranks are greater than 1, and such a precoding matrix is used to set transmit power of a blocked transmission port to 0.

Figure 7:
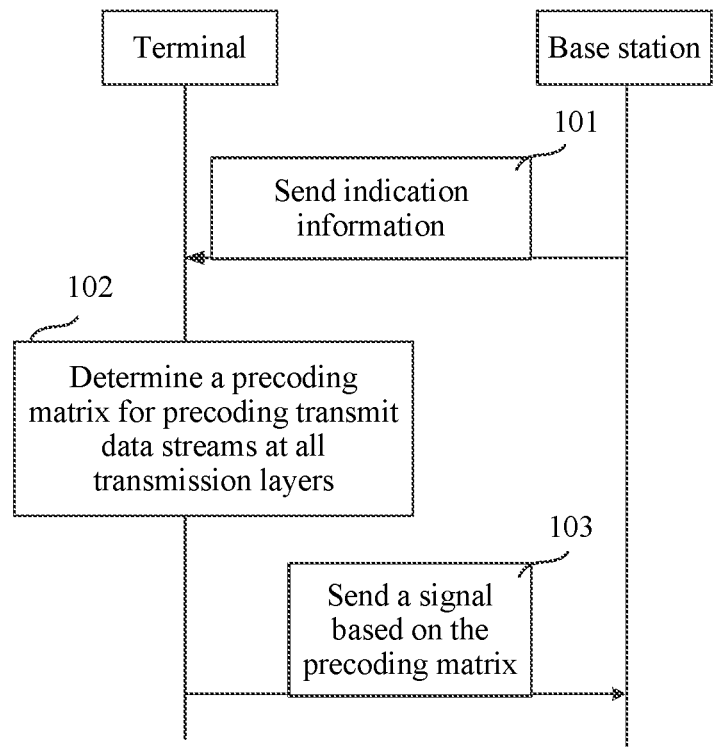
FIG. 7 is a schematic diagram of a method procedure of a communication method according to this application.

Based on the design idea of the uplink codebook in the foregoing three scenarios, this application provides a communication method. As shown in FIG. 7, the method mainly includes the following steps.

Step 101: A base station determines indication information, and sends the indication information to a terminal, where the indication information includes a first bit field, and the first bit field is used to indicate a precoding matrix included in a first precoding matrix set and a transmission rank corresponding to the precoding matrix.

The precoding matrix is used to precode transmit data streams at r transmission layers to obtain signals to be sent on N transmission ports of the terminal. A quantity of rows of the precoding matrix is equal to the quantity N of transmission ports, and N=4. A quantity of columns of the precoding matrix is equal to the quantity r of transmission layers, 1≤r≤N, and a value of the transmission rank is equal to the quantity r of transmission layers.

When r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1.

For detailed descriptions of the precoding matrix, refer to the foregoing related explanations of the precoding matrix.

Step 102: The terminal receives the indication information sent by the base station, and determines the precoding matrix for precoding transmit data streams at all transmission layers.

Step 103: The terminal precodes the transmit data streams at all the transmission layers based on the precoding matrix to obtain signals to be sent on N transmission ports, and sends the sent signals to the base station.

In this application, when r>1, the nonscalar part of the precoding matrix whose transmission rank is r in the first precoding matrix set is obtained by combining the columns in the nonscalar parts of the r precoding matrices, and the r precoding matrices are precoding matrices selected from all the precoding matrices whose transmission ranks are 1. In other words, it may be considered that a precoding matrix whose rank is greater than 1 in an uplink codebook is obtained by concatenating precoding matrices whose ranks are 1. Therefore, implementation complexity of the terminal can be reduced, and an uplink codebook with low downlink signaling indication overheads and better performance can be ensured. Compared with a prior-art uplink codebook that uses a DFT-S-OFDM waveform and that is applied to LTE-A, in codebook designs in cases of a rank 2 and a rank 3, a precoding matrix is generated by performing column extraction on MUBs, so as to maximize a minimum precoding matrix spacing and improve performance.

Optionally, non-zero elements included in each precoding matrix in the first precoding matrix set include some or all of 1, −1, j, and −j.

Optionally, a 2-norm of a row including a non-zero element is always ½ in all the precoding matrices in the first precoding matrix set.

Optionally, four transmission ports are classified into a first port group and a second port group, and two transmission ports included in each of the first port group and the second port group correspond to one dual-polarized antenna pair or correspond to two beams with a same beam direction but vertical polarization directions. For example, in the dual-polarized antenna pair assumption shown in FIG. 2, two transmission ports included in the first port group are a port 1 and a port 3, and two transmission ports included in the second port group are a port 2 and a port 4. The port 1 and the port 3 correspond to one dual-polarized antenna pair, and the port 2 and the port 4 correspond to another dual-polarized antenna pair. Alternatively, the port 1 and the port 3 correspond to two beams with a same beam direction but vertical polarization directions, and the port 2 and the port 4 correspond to two beams with a same beam direction but vertical polarization directions.

A universal uplink transmission scenario is considered in this application, so that a minimum precoding matrix spacing can be maximized, and DCI signaling indication overheads can be reduced.

Optionally, in the first implementation scenario of the foregoing embodiment, the terminal supports a fully coherent transmission state of the four transmission ports, in other words, coherent transmission can be performed in the first port group, in the second port group, and between the first port group and the second port group. Correspondingly, the first precoding matrix set in step 101 is an uplink codebook corresponding to Scenario 1.

When the first precoding matrix set in step 101 is the uplink codebook corresponding to Scenario 1, correspondingly, a precoding matrix whose transmission rank is 1 and a precoding matrix whose transmission rank is greater than 1 that are included in the first precoding matrix set in step 101 have the following characteristics:

All the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

Specifically, this application provides the following solution for the uplink codebook designed in Scenario 1:

When there is one transmission data stream, to ensure that a precoding process for multi-antenna transmission of the terminal is not affected by waveform switching when a rank is 1, this application provides a precoding matrix whose rank is 1, that uses a CP-OFDM waveform, and that is applied to NR, as shown in Table 5. The precoding matrix whose rank is 1 and that is shown in Table 5 is the same as a precoding matrix whose rank is 1, that uses the DFT-S-OFDM waveform, and that is applied to NR. A difference from the LTE-A codebook is that precoding matrices with a single-port beam selection function, to be specific, precoding matrices whose precoding matrix sequence numbers are 24 to 27 in Table 5 are added to precoding matrices whose ranks are 1, that use the CP-OFDM waveform, and that are applied to NR.

As shown in Table 5, there are 28 precoding matrices whose ranks are 1: precoding matrices whose precoding matrix sequence numbers are 0 to 27.

For example, precoding matrices in the first precoding matrix subset include precoding matrices whose precoding matrix sequence numbers are 0 to 15 in Table 5, and precoding matrices in the second precoding matrix subset include precoding matrices whose precoding matrix sequence numbers are 24 to 27 in Table 5.

TABLE 5

| Precoding matrix sequence number | One transmission data stream |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 24-27 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ — — — — |

For fully coherent transmission when a rank is 2, considering that a low peak-to-average ratio characteristic is no longer a main design requirement, a minimum precoding matrix spacing needs to be maximized to optimize sampling in four-dimensional complex space as much as possible. Therefore, in this solution, an MUB basis-based column selection method is used to obtain a precoding matrix whose rank is 2.

When there are two transmission data streams, all precoding matrices whose transmission ranks are 2 include a third precoding matrix subset, a nonscalar part of each precoding matrix in the third precoding matrix subset includes two columns, and the two columns include columns of two mutually orthogonal precoding matrices selected from the first precoding matrix subset.

In other words, to determine a nonscalar part of any precoding matrix whose transmission rank is 2, two orthogonal precoding matrices may be selected from the precoding matrices whose precoding matrix sequence numbers are 0 to 15 in Table 5, and columns of the two orthogonal precoding matrices are combined to obtain a nonscalar part of a precoding matrix whose transmission rank is 2. The column combination herein is placing single columns of two precoding matrices whose ranks are 1 abreast, to obtain two columns. Because hybrid coding is performed on a precoding matrix sequence number and a transmission rank sequence number, sorting of the two single columns is not limited.

The precoding matrices whose precoding matrix sequence numbers are 0 to 15 in Table 5 are completely the same as precoding matrices whose precoding matrix sequence numbers are 0 to 15 in Table 1. It can be learned, from explanations of the precoding matrices whose precoding matrix sequence numbers are 0 to 15 and that are shown in Table 1, that there are four groups of orthogonal bases for the precoding matrices whose precoding matrix sequence numbers are 0 to 15, each group of orthogonal bases includes four precoding matrices, and the four precoding matrices are mutually orthogonal. For ease of description, precoding matrix sequence number sets are used to represent the precoding matrices included in the four groups of orthogonal bases. Details are as follows:

orthogonal basis 1: [0, 2, 8, 10]
orthogonal basis 2: [1, 3, 9, 11]
orthogonal basis 3: [4, 6, 12, 14]
orthogonal basis 4: [5, 7, 13, 15]

With reference to the understanding of FIG. 2 in this application, this application provides three methods for selecting two orthogonal precoding matrices from the four orthogonal bases and then generating a precoding matrix whose rank is 2.

Method 1: Column combination is performed on precoding matrices with same beam space but different cross-polarization phases in the four groups of orthogonal bases, to obtain a precoding matrix whose rank is 2. Therefore, the following columns included in nonscalar parts of eight precoding matrices may be obtained: [0, 2], [8, 10], [1, 3], [9, 11], [4, 6], [12, 14], [5, 7], and [13, 15].

It should be noted that when a precoding matrix indicated by a TPMI changes, total average power of a corresponding transmission port remains unchanged unless the port is disabled (a corresponding element is 0). Such a characteristic should also be used in a codebook design when a rank is greater than 1. Therefore, to ensure that total average power of a corresponding transmission port remains unchanged when a precoding matrix indicated by a TPMI changes, including a rank change, a normalization factor of each precoding matrix whose rank is 2 needs to be $$\frac{1}{\sqrt{8}}.$$

The normalization factor is a scalar part of the precoding matrix.

Therefore, the following eight precoding matrices may be obtained based on the normalization factor $$\frac{1}{\sqrt{8}}$$

and columns of precoding matrices in Table 5 that correspond to precoding matrix sequence numbers in [0, 2], [8, 10], [1, 3], [9, 11], [4, 6], [12, 14], [5, 7], and [13, 15]:

$$\frac{1}{\sqrt{8}}\begin{bmatrix}1 & 1\\1 & 1\\1 & -1\\-1 & 1\end{bmatrix}, \frac{1}{\sqrt{8}}\begin{bmatrix}1 & 1\\-1 & -1\\1 & -1\\1 & -1\end{bmatrix}, \frac{1}{\sqrt{8}}\begin{bmatrix}1 & 1\\1 & 1\\j & -j\\j & -j\end{bmatrix}, \frac{1}{\sqrt{8}}\begin{bmatrix}1 & 1\\-1 & -1\\j & -j\\-j & j\end{bmatrix},$$

$$\frac{1}{\sqrt{8}}\begin{bmatrix}1 & 1\\j & j\\1 & -1\\j & -j\end{bmatrix}, \frac{1}{\sqrt{8}}\begin{bmatrix}1 & 1\\-j & -j\\1 & -1\\-j & j\end{bmatrix}, \frac{1}{\sqrt{8}}\begin{bmatrix}1 & 1\\j & j\\j & -j\\1 & -1\end{bmatrix}, \frac{1}{\sqrt{8}}\begin{bmatrix}1 & 1\\-j & -j\\j & -j\\-1 & 1\end{bmatrix}$$

The eight precoding matrices are referred to as first-type precoding matrices in precoding matrices whose ranks are 2. A first column and a second column of the first-type precoding matrix have completely same beam space but different cross-polarization phases.

Method 2: Column combination is performed on precoding matrices with opposite beam space but a same cross-polarization phase in the four groups of orthogonal bases, to obtain a precoding matrix whose rank is 2. Therefore, the following columns included in nonscalar parts of eight precoding matrices may be obtained: [0, 8], [2, 10], [1, 9], [3, 11], [4, 12], [6, 14], [5, 13], and [7, 15]. Therefore, the following eight precoding matrices may be obtained based on a determined normalization factor $$\frac{1}{\sqrt{8}}$$

and columns of precoding matrices in Table 5 that correspond to precoding matrix sequence numbers in [0, 8], [2, 10], [1, 9], [3, 11], [4, 12], [6, 14], [5, 13], and [7, 15]:

$$\frac{1}{\sqrt{8}}\begin{bmatrix}1 & 1\\1 & -1\\1 & 1\\-1 & 1\end{bmatrix}, \frac{1}{\sqrt{8}}\begin{bmatrix}1 & 1\\1 & -1\\-1 & -1\\1 & -1\end{bmatrix}, \frac{1}{\sqrt{8}}\begin{bmatrix}1 & 1\\1 & -1\\j & j\\j & -j\end{bmatrix}, \frac{1}{\sqrt{8}}\begin{bmatrix}1 & 1\\1 & -1\\-j & -j\\-j & j\end{bmatrix},$$

$$\frac{1}{\sqrt{8}}\begin{bmatrix}1 & 1\\j & -j\\1 & 1\\j & -j\end{bmatrix}, \frac{1}{\sqrt{8}}\begin{bmatrix}1 & 1\\j & -j\\-1 & -1\\-j & j\end{bmatrix}, \frac{1}{\sqrt{8}}\begin{bmatrix}1 & 1\\j & -j\\j & j\\1 & -1\end{bmatrix}, \frac{1}{\sqrt{8}}\begin{bmatrix}1 & 1\\j & -j\\-j & -j\\-1 & 1\end{bmatrix}$$

The eight precoding matrices are referred to as second-type precoding matrices in precoding matrices whose ranks are 2. A first column and a second column of the second-type precoding matrix have opposite beam space but a same cross-polarization phase.

Method 3: Column combination is performed on precoding matrices with opposite beam space and different cross-polarization phases in the four groups of orthogonal bases, to obtain a precoding matrix whose rank is 2. Therefore, the following columns included in nonscalar parts of eight precoding matrices may be obtained: [0, 10], [2, 8], [1, 11], [3, 9], [4, 14], [6, 12], [5, 15], and [7, 13].

Therefore, the following eight precoding matrices may be obtained based on a determined normalization factor $$\frac{1}{\sqrt{8}}$$

and columns of precoding matrices in Table 5 that correspond to precoding matrix sequence numbers in [0, 10], [2, 8], [1, 11], [3, 9], [4, 14], [6, 12], [5, 15], and [7, 13]:

$$\frac{1}{\sqrt{8}}\begin{bmatrix}1 & 1\\1 & -1\\1 & -1\\-1 & -1\end{bmatrix}, \frac{1}{\sqrt{8}}\begin{bmatrix}1 & 1\\1 & -1\\-1 & 1\\1 & 1\end{bmatrix},$$

$$\frac{1}{\sqrt{8}}\begin{bmatrix}1 & 1\\1 & -1\\j & -j\\j & j\end{bmatrix}, \frac{1}{\sqrt{8}}\begin{bmatrix}1 & 1\\1 & -1\\-j & j\\-j & -j\end{bmatrix}, \frac{1}{\sqrt{8}}\begin{bmatrix}1 & 1\\j & -j\\1 & -1\\j & j\end{bmatrix},$$

$$\frac{1}{\sqrt{8}}\begin{bmatrix}1 & 1\\j & -j\\-1 & 1\\-j & -j\end{bmatrix}, \frac{1}{\sqrt{8}}\begin{bmatrix}1 & 1\\j & -j\\j & -j\\1 & 1\end{bmatrix}, \frac{1}{\sqrt{8}}\begin{bmatrix}1 & 1\\j & -j\\-j & j\\-1 & -1\end{bmatrix}$$

The eight precoding matrices are referred to as third-type precoding matrices in precoding matrices whose ranks are 2. A first column and a second column of the second-type precoding matrix have opposite beam space and different cross-polarization phases.

In an optional embodiment, if the third precoding matrix subset includes the eight first-type precoding matrices, the eight second-type precoding matrices, and the eight third-type precoding matrices, the third precoding matrix subset includes 24 precoding matrices. Therefore, a minimum projection 2-norm distance can be maximized. Herein the projection 2-norm distance is one of Grassmannian space distances. Document [1] proves that maximizing the minimum projection 2-norm distance between precoding matrices can achieve optimal MSE decoding performance ([1] D. J. Love and R. W. Heath, "Limited feedback unitary precoding for spatial multiplexing systems," in *IEEE Transactions on Information Theory*, vol. 51, no. 8, pp. 2967-2976, August 2005.doi: 10.1109/TIT.2005.850152).

When there are three transmission data streams, for fully coherent transmission when a rank is 3, a rule similar to that for a rank 2 is used: Three-out-of-four exhaustion is separately performed on four groups of orthogonal bases, to generate 16 precoding matrices. Columns included in nonscalar parts of the 16 precoding matrices may be represented as follows:

[0, 2, 8], [8, 10, 2], [1, 3, 9], [9, 11, 3], [4, 6, 12], [12, 14, 6], [5, 7, 13], [13, 15, 7], [0, 8, 10], [2, 10, 0], [1, 9, 11], [3, 11, 1], [4, 12, 14], [6, 14, 4], [5, 13, 15], and [7, 15, 5].

To ensure that total average power of a corresponding transmission port remains unchanged when a precoding matrix indicated by a TPMI changes, including a rank change, a normalization factor of each precoding matrix whose rank is 3 needs to be $$\frac{1}{\sqrt{12}}.$$

The normalization factor is a scalar part of the precoding matrix.

The following 16 precoding matrices may be obtained based on the determined normalization factor $$\frac{1}{\sqrt{12}}$$

and columns of precoding matrices in Table 5 that correspond to these precoding matrix sequence numbers:

$$\frac{1}{\sqrt{12}}\begin{bmatrix} 1 & 1 & 1 \\ 1 & 1 & -1 \\ 1 & -1 & 1 \\ -1 & 1 & 1 \end{bmatrix}, \frac{1}{\sqrt{12}}\begin{bmatrix} 1 & 1 & 1 \\ -1 & -1 & 1 \\ 1 & -1 & -1 \\ 1 & -1 & 1 \end{bmatrix},$$

$$\frac{1}{\sqrt{12}}\begin{bmatrix} 1 & 1 & 1 \\ 1 & 1 & -1 \\ j & -j & j \\ j & -j & -j \end{bmatrix}, \frac{1}{\sqrt{12}}\begin{bmatrix} 1 & 1 & 1 \\ -1 & -1 & 1 \\ j & -j & -j \\ -j & j & -j \end{bmatrix}, \frac{1}{\sqrt{12}}\begin{bmatrix} 1 & 1 & 1 \\ j & j & -j \\ 1 & -1 & 1 \\ j & -j & -j \end{bmatrix},$$

$$\frac{1}{\sqrt{12}}\begin{bmatrix} 1 & 1 & 1 \\ -j & -j & j \\ 1 & -1 & -1 \\ -j & j & -j \end{bmatrix}, \frac{1}{\sqrt{12}}\begin{bmatrix} 1 & 1 & 1 \\ j & j & -j \\ j & -j & j \\ 1 & -1 & -1 \end{bmatrix}, \frac{1}{\sqrt{12}}\begin{bmatrix} 1 & 1 & 1 \\ -j & -j & j \\ j & -j & -j \\ -1 & 1 & -1 \end{bmatrix},$$

$$\frac{1}{\sqrt{12}}\begin{bmatrix} 1 & 1 & 1 \\ 1 & -1 & -1 \\ 1 & 1 & -1 \\ -1 & 1 & -1 \end{bmatrix}, \frac{1}{\sqrt{12}}\begin{bmatrix} 1 & 1 & 1 \\ 1 & -1 & 1 \\ -1 & -1 & 1 \\ 1 & -1 & -1 \end{bmatrix},$$

$$\frac{1}{\sqrt{12}}\begin{bmatrix} 1 & 1 & 1 \\ 1 & -1 & -1 \\ j & j & -j \\ j & -j & j \end{bmatrix}, \frac{1}{\sqrt{12}}\begin{bmatrix} 1 & 1 & 1 \\ 1 & -1 & 1 \\ -j & -j & j \\ -j & j & j \end{bmatrix}, \frac{1}{\sqrt{12}}\begin{bmatrix} 1 & 1 & 1 \\ j & -j & -j \\ 1 & 1 & -1 \\ j & -j & j \end{bmatrix},$$

$$\frac{1}{\sqrt{12}}\begin{bmatrix} 1 & 1 & 1 \\ j & -j & j \\ -1 & -1 & 1 \\ -j & j & j \end{bmatrix}, \frac{1}{\sqrt{12}}\begin{bmatrix} 1 & 1 & 1 \\ j & -j & -j \\ j & j & -j \\ 1 & -1 & 1 \end{bmatrix}, \frac{1}{\sqrt{12}}\begin{bmatrix} 1 & 1 & 1 \\ j & -j & j \\ -j & -j & j \\ -1 & 1 & 1 \end{bmatrix},$$

In an optional embodiment, the fourth precoding matrix subset may include the 16 precoding matrices.

When there are four transmission data streams, that is, a rank is 4, because a precoding matrix of four rows and four columns is a full-rank matrix, a projection 2-norm distance between any two orthogonal bases is 0. Therefore, when the rank is 4, only one precoding matrix is designed, which is consistent with a design of an LTE-A codebook. A nonscalar part of the precoding matrix includes four columns, and the four columns include columns of all the precoding matrices included in the second precoding matrix subset, and may be represented as [24, 25, 26, 27].

To ensure that total average power of a corresponding transmission port remains unchanged when a precoding matrix indicated by a TPMI changes, including a rank change, a normalization factor of a precoding matrix whose rank is 4 needs to be ½.

The following precoding matrix whose rank is 4 may be obtained based on the determined normalization factor ½ and columns of precoding matrices in Table 5 that correspond to these precoding matrix sequence numbers:

$$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In addition, when the first precoding matrix set in step 101 is the uplink codebook corresponding to Scenario 1, assuming that an antenna is blocked on the four antenna ports, in other words, AGI occurs, AGI is likely to occur on one dual-polarized antenna pair (in other words, one port group). Based on the assumption, rank-2 transmission can still be performed on the other dual-polarized antenna pair. Based on this, in this application, two precoding matrices are further added to all the precoding matrices whose transmission ranks are 2, to instruct to disable transmission ports included in a same port group.

Optionally, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group. Two precoding matrices are added to the precoding matrices whose ranks are 2, so as to disable a radio frequency link of the blocked transmission port.

Specifically, considering the dual-polarized antenna pair assumption corresponding to FIG. 2, two precoding matrices used for port selection may be added to the precoding matrices whose ranks are 2, and columns included in non-scalar parts of the two precoding matrices may be represented as [24, 26] and [25, 27]. The following two precoding matrices may be obtained based on the determined normalization factor ½ and columns of precoding matrices in Table 5 that correspond to these precoding matrix sequence numbers:

$$\frac{1}{2}\begin{bmatrix} 1 & 0 \\ 0 & 0 \\ 0 & 1 \\ 0 & 0 \end{bmatrix}, \frac{1}{2}\begin{bmatrix} 0 & 0 \\ 1 & 0 \\ 0 & 0 \\ 0 & 1 \end{bmatrix},$$

The same as a case for a rank 4, because rank-2 transmission is performed on an enabled port group, a submatrix that includes rows including non-zero elements in the first precoding matrix and the second precoding matrix is a full-rank matrix. Because a projection 2-norm distance between any two of all orthogonal bases for the full-rank matrix is 0, only one codeword needs to be designed for each enabled port group.

It can be learned that, based on the design, for fully coherent transmission, if first bit fields are allowed to indicate TRIs and TPMIs of all precoding matrices whose ranks are 1 to 4, there are a total of 28 precoding matrices whose ranks are 1: the precoding matrices whose precoding matrix sequence numbers are 0 to 27 and that are shown in Table 5;

there are a total of 26 precoding matrices whose ranks are 2, and the 26 precoding matrices include the 24 precoding matrices in the third precoding matrix subset and the two precoding matrices in the eighth precoding matrix subset;

there are a total of 16 precoding matrices whose ranks are 3: the 16 precoding matrices in the fourth precoding matrix subset; and there is one precoding matrix whose rank is 4.

Therefore, there are a total of 28+26+16+1=71 precoding matrices. If hybrid coding is performed on a TPMI and a transmit rank indication (Transmit Rank Indication, TRI), in other words, when the indication information in step 101 includes the first bit field and the first bit field indicates the precoding matrix in the first precoding matrix set and the transmission rank corresponding to the precoding matrix, 7 bits are required in the first bit field for indication.

The indication information in step 101 is indicated to the terminal by using DCI. Considering that there should be as few DCI indication bits as possible to ensure highly reliable decoding on a downlink control channel, removing eight precoding matrices from the 71 precoding matrices needs to be considered to obtain an uplink codebook including 63 precoding matrices. In this case, only 6 bits are required to indicate the TPMI and the TRI.

An implementation, provided in this application, of removing eight precoding matrices from the 71 precoding matrices includes the following implementation options:

Implementation option 1: The rank-2 third precoding matrix subset still includes any two types of the first-type precoding matrix, the second-type precoding matrix, and the third-type precoding matrix.

For example, the eight first-type precoding matrices in the rank-2 third precoding matrix subset are removed, in other words, the eight second-type precoding matrices and the eight third-type precoding matrices remain in the third precoding matrix subset.

For example, the eight second-type precoding matrices in the rank-2 third precoding matrix subset are removed, in other words, the eight first-type precoding matrices and the eight third-type precoding matrices remain in the third precoding matrix subset.

For example, the eight third-type precoding matrices in the rank-2 third precoding matrix subset are removed, in other words, the eight first-type precoding matrices and the eight second-type precoding matrices remain in the third precoding matrix subset.

Considering that it is a low necessity to select opposite cross-polarization phases when beam space is opposite, the eight first-type precoding matrices and the eight second-type precoding matrices may remain in the third precoding matrix subset.

Implementation option 2: The eight first-type precoding matrices, four second-type precoding matrices, and four third-type precoding matrices remain in the rank-2 third precoding matrix subset.

The second-type precoding matrices and the third-type precoding matrices whose ranks are 2 include precoding matrices with opposite beam space. If four second-type precoding matrices and four third-type precoding matrices are removed, uniform sampling can be ensured for a same cross-polarization phase and different cross-polarization phases. It should be noted that, it needs to be ensured that all remaining precoding matrices are included in the four groups of orthogonal bases, and two orthogonal precoding matrices in a same group of orthogonal bases need to be deleted together during precoding matrix deletion.

For example, among the precoding matrices whose ranks are 2, four precoding matrices [1, 9], [3, 11], [4, 12], and [6, 14] are removed from the eight second-type precoding matrices [0, 8], [2, 10], [1, 9], [3, 11], [4, 12], [6, 14], [5, 13], and [7, 15], and four precoding matrices [0, 10], [2, 8], [5, 15], and [7, 13] are removed from the eight third-type precoding matrices [0, 10], [2, 8], [1, 11], [3, 9], [4, 14], [6, 12], [5, 15], and [7, 13].

Implementation option 3: Four precoding matrices are removed from the rank-2 third precoding matrix subset, where columns of the four precoding matrices include columns of precoding matrices selected from precoding matrices whose ranks are 1 in the orthogonal basis 1 and the orthogonal basis 4; and four precoding matrices are removed from the rank-3 fourth precoding matrix subset, where columns of the four precoding matrices include columns of precoding matrices selected from the precoding matrices whose ranks are 1 in the orthogonal basis 1 and the orthogonal basis 4.

This implementation option is to optimize a quantity of precoding matrices when beam space respectively corresponding to two polarization directions is highly correlated. When the two transmission port groups are highly correlated (for example, when a spacing between the dual-polarized antenna pairs corresponding to the two transmission port groups is a 0.5-x wavelength), and when a rank is greater than 1, the orthogonal basis 1 and the orthogonal basis 4 are less likely to occur than the orthogonal basis 2 and the orthogonal basis 3. Therefore, four precoding matrices are removed from the precoding matrices whose ranks are 1 in the orthogonal basis 1 and the orthogonal basis 4 in each case of a rank 2 and a rank 3. For example, when a rank is 2, the following four precoding matrices are removed from the third precoding matrix subset: [5, 13], [7, 15], [0, 8], and [2, 10]. When a rank is 3, the following four precoding matrices are removed from the fourth precoding matrix subset: [0, 8, 10], [2, 10, 0], [5, 13, 15], and [7, 15, 5].

TABLE 6

| Precoding matrix sequence number | Two transmission data streams | | | |
|---|---|---|---|---|
| 0-3 | $\frac{1}{\sqrt{8}}\begin{bmatrix} 1 & 1 \\ 1 & 1 \\ 1 & -1 \\ -1 & 1 \end{bmatrix}$ | $\frac{1}{\sqrt{8}}\begin{bmatrix} 1 & 1 \\ -1 & -1 \\ 1 & -1 \\ 1 & -1 \end{bmatrix}$ | $\frac{1}{\sqrt{8}}\begin{bmatrix} 1 & 1 \\ 1 & 1 \\ j & -j \\ j & -j \end{bmatrix}$ | $\frac{1}{\sqrt{8}}\begin{bmatrix} 1 & 1 \\ -1 & -1 \\ j & -j \\ -j & j \end{bmatrix}$ |

TABLE 6-continued

| Precoding matrix sequence number | Two transmission data streams | | | |
|---|---|---|---|---|
| 4-7 | $\frac{1}{\sqrt{8}}\begin{bmatrix}1 & 1\\ j & j\\ 1 & -1\\ j & -j\end{bmatrix}$ | $\frac{1}{\sqrt{8}}\begin{bmatrix}1 & 1\\ -j & -j\\ 1 & -1\\ -j & j\end{bmatrix}$ | $\frac{1}{\sqrt{8}}\begin{bmatrix}1 & 1\\ j & j\\ j & -j\\ 1 & -1\end{bmatrix}$ | $\frac{1}{\sqrt{8}}\begin{bmatrix}1 & 1\\ -j & -j\\ j & -j\\ -1 & 1\end{bmatrix}$ |
| 8-11 | $\frac{1}{\sqrt{8}}\begin{bmatrix}1 & 1\\ 1 & -1\\ 1 & 1\\ -1 & 1\end{bmatrix}$ | $\frac{1}{\sqrt{8}}\begin{bmatrix}1 & 1\\ 1 & -1\\ -1 & -1\\ 1 & -1\end{bmatrix}$ | $\frac{1}{\sqrt{8}}\begin{bmatrix}1 & 1\\ 1 & -1\\ j & j\\ j & -j\end{bmatrix}$ | $\frac{1}{\sqrt{8}}\begin{bmatrix}1 & 1\\ 1 & -1\\ -j & -j\\ -j & j\end{bmatrix}$ |
| 12-15 | $\frac{1}{\sqrt{8}}\begin{bmatrix}1 & 1\\ j & -j\\ 1 & 1\\ j & -j\end{bmatrix}$ | $\frac{1}{\sqrt{8}}\begin{bmatrix}1 & 1\\ j & -j\\ -1 & -1\\ -j & j\end{bmatrix}$ | $\frac{1}{\sqrt{8}}\begin{bmatrix}1 & 1\\ 1 & -1\\ j & -j\\ j & j\end{bmatrix}$ | $\frac{1}{\sqrt{8}}\begin{bmatrix}1 & 1\\ 1 & -1\\ -j & j\\ -j & -j\end{bmatrix}$ |
| 16-19 | $\frac{1}{\sqrt{8}}\begin{bmatrix}1 & 1\\ j & -j\\ 1 & -1\\ j & j\end{bmatrix}$ | $\frac{1}{\sqrt{8}}\begin{bmatrix}1 & 1\\ j & -j\\ -1 & 1\\ -j & -j\end{bmatrix}$ | $\frac{1}{\sqrt{8}}\begin{bmatrix}1 & 1\\ j & -j\\ j & -j\\ 1 & 1\end{bmatrix}$ | $\frac{1}{\sqrt{8}}\begin{bmatrix}1 & 1\\ j & -j\\ j & -j\\ 1 & 1\end{bmatrix}$ |
| 20-21 | $\frac{1}{2}\begin{bmatrix}1 & 0\\ 0 & 0\\ 0 & 1\\ 0 & 0\end{bmatrix}$ | $\frac{1}{2}\begin{bmatrix}0 & 0\\ 1 & 0\\ 0 & 0\\ 0 & 1\end{bmatrix}$ | — | — |

TABLE 7

| Precoding matrix sequence number | Three transmission data streams | | | |
|---|---|---|---|---|
| 0-3 | $\frac{1}{\sqrt{12}}\begin{bmatrix}1 & 1 & 1\\ 1 & 1 & -1\\ 1 & -1 & 1\\ -1 & 1 & 1\end{bmatrix}$ | $\frac{1}{\sqrt{12}}\begin{bmatrix}1 & 1 & 1\\ 1 & -1 & 1\\ -1 & -1 & 1\\ 1 & -1 & -1\end{bmatrix}$ | $\frac{1}{\sqrt{12}}\begin{bmatrix}1 & 1 & 1\\ j & j & -j\\ j & -j & j\\ 1 & -1 & -1\end{bmatrix}$ | $\frac{1}{\sqrt{12}}\begin{bmatrix}1 & 1 & 1\\ j & j & -j\\ j & -j & j\\ 1 & -1 & -1\end{bmatrix}$ |
| 4-7 | $\frac{1}{\sqrt{12}}\begin{bmatrix}1 & 1 & 1\\ j & j & -j\\ 1 & -1 & 1\\ j & -j & -j\end{bmatrix}$ | $\frac{1}{\sqrt{12}}\begin{bmatrix}1 & 1 & 1\\ -j & -j & j\\ 1 & -1 & -1\\ -j & j & -j\end{bmatrix}$ | $\frac{1}{\sqrt{12}}\begin{bmatrix}1 & 1 & 1\\ 1 & 1 & -1\\ j & -j & j\\ j & -j & -j\end{bmatrix}$ | $\frac{1}{\sqrt{12}}\begin{bmatrix}1 & 1 & 1\\ -1 & -1 & 1\\ j & -j & -j\\ -j & j & -j\end{bmatrix}$ |
| 8-11 | $\frac{1}{\sqrt{12}}\begin{bmatrix}1 & 1 & 1\\ j & -j & -j\\ 1 & 1 & -1\\ j & -j & j\end{bmatrix}$ | $\frac{1}{\sqrt{12}}\begin{bmatrix}1 & 1 & 1\\ j & -j & j\\ -1 & -1 & 1\\ -j & j & -j\end{bmatrix}$ | $\frac{1}{\sqrt{12}}\begin{bmatrix}1 & 1 & 1\\ 1 & -1 & -1\\ j & j & -j\\ j & -j & j\end{bmatrix}$ | $\frac{1}{\sqrt{12}}\begin{bmatrix}1 & 1 & 1\\ 1 & -1 & 1\\ -j & -j & j\\ -j & j & j\end{bmatrix}$ |

TABLE 8

| Precoding matrix sequence number | Four transmission data streams |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Implementation option 4: Eight precoding matrices are removed from the rank-3 fourth precoding matrix subset. Columns of the eight precoding matrices include columns of precoding matrices selected from the precoding matrices whose ranks are 1 in the orthogonal basis 1, the orthogonal basis 2, the orthogonal basis 3, and the orthogonal basis 4. For example, when a rank is 3, the following eight precoding matrices are removed from the fourth precoding matrix subset: [0, 8, 10], [2, 10, 0], [1, 9, 11], [3, 11, 1], [4, 12, 14], [6, 14, 4], [5, 13, 15], and [7, 15, 5].

For a solution of the implementation option 3 for optimizing a quantity of precoding matrices, this application provides an optimized first precoding matrix set.

For the 28 precoding matrices whose ranks are 1, refer to Table 5.

For 22 precoding matrices whose ranks are 2, refer to Table 6. The 22 precoding matrices include the 20 precoding matrices (whose precoding matrix sequence numbers are 0 to 19 in Table 6) in the third precoding matrix subset and the two precoding matrices (whose precoding matrix sequence numbers are 20 and 21 in Table 6) in the eighth precoding matrix.

For 12 precoding matrices whose ranks are 3, refer to Table 7. The 12 precoding matrices include 12 precoding matrices (whose precoding matrix sequence numbers are 0 to 11 in Table 7) in the fourth precoding matrix subset.

For one precoding matrix whose rank is 4, refer to Table 8.

Based on the design, there are a total of 28+22+12+1=63 precoding matrices in the uplink codebook corresponding to Scenario 1, and only 6 bits are required for indication if hybrid coding is performed on the TPMI and the TRI.

Optionally, when the four transmission ports are classified into the first port group and the second port group, in the second implementation scenario of the foregoing embodiment, the terminal supports a partially coherent transmission state of the four transmission ports, to be specific, coherent transmission can be performed in the first port group and in the second port group, but coherent transmission cannot be performed between the first port group and the second port group. Correspondingly, the first precoding matrix set in step 101 is an uplink codebook corresponding to Scenario 2.

When the first precoding matrix set in step 101 is the uplink codebook corresponding to Scenario 1, correspondingly, a precoding matrix whose transmission rank is 1 and a precoding matrix whose transmission rank is greater than 1 that are included in the first precoding matrix set in step 101 have the following characteristics:

All the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

Specifically, this application provides the following solution for the uplink codebook designed in Scenario 2:

A difference from LTE-A precoding matrices whose ranks are 2 and 3 is that for partially coherent transmission, the UE can learn two transmission ports between which coherent transmission can be performed, and therefore, unlike LTE, there is no need to exhaustively list all possible port combinations. When coherent transmission can be performed between the port 1 and the port 3 in the first port group, and/or when coherent transmission can be performed between the port 2 and the port 4 in the second port group, this application provides the solution for the uplink codebook designed in Scenario 2.

When the first precoding matrix set in step 101 is the uplink codebook corresponding to Scenario 2, when a rank is 1, a total of 12 precoding matrices: precoding matrices whose precoding matrix sequence numbers are 16 to 27 in Table 5 are used as all the precoding matrices whose transmission ranks are 1.

All the precoding matrices whose transmission ranks are 1 include the fifth precoding matrix subset and the second precoding matrix subset based on a quantity of non-zero elements included in columns of the precoding matrices. The fifth precoding matrix subset includes precoding matrices whose precoding matrix sequence numbers are 16 to 23 in Table 5, and a column of each precoding matrix includes two non-zero elements. The second precoding matrix subset includes precoding matrices whose precoding matrix sequence numbers are 24 to 27 in Table 5, and a column of each precoding matrix includes one non-zero element. Referring to Table 5, non-zero elements included in all of the four precoding matrices whose precoding matrix sequence numbers are 24 to 27 are located in different rows.

When the first precoding matrix set in step 101 is the uplink codebook corresponding to Scenario 2, when a rank is 2, based on the assumption of the two dual-polarized antenna pairs in FIG. 2, QPSK phases of each dual-polarized antenna pair may be exhaustively listed. To be specific, the following columns included in nonscalar parts of 16 precoding matrices may be obtained from columns of two precoding matrices randomly selected from the fifth precoding matrix subset: [16, 20], [16, 21], [16, 22], [16, 23], [17, 20], [17, 21], [17, 22], [17, 23], [18, 20], [18, 21], [18, 22], [18, 23], [19, 20], [19, 21], [19, 22], and [19, 23].

To ensure that total average power of a corresponding transmission port remains unchanged when a precoding matrix indicated by a TPMI changes, including a rank change, a normalization factor of a precoding matrix whose rank is 2 needs to be ½.

The following precoding matrices whose ranks are 2 may be obtained based on the determined normalization factor ½ and columns of precoding matrices in Table 5 that correspond to these precoding matrix sequence numbers:

$$\frac{1}{2}\begin{bmatrix}1 & 0\\0 & 1\\1 & 0\\0 & 1\end{bmatrix}, \frac{1}{2}\begin{bmatrix}1 & 0\\0 & 1\\1 & 0\\0 & -1\end{bmatrix}, \frac{1}{2}\begin{bmatrix}1 & 0\\0 & 1\\1 & 0\\0 & j\end{bmatrix}, \frac{1}{2}\begin{bmatrix}1 & 0\\0 & 1\\1 & 0\\0 & -j\end{bmatrix},$$

$$\frac{1}{2}\begin{bmatrix}1 & 0\\0 & 1\\-1 & 0\\0 & 1\end{bmatrix}, \frac{1}{2}\begin{bmatrix}1 & 0\\0 & 1\\-1 & 0\\0 & -1\end{bmatrix}, \frac{1}{2}\begin{bmatrix}1 & 0\\0 & 1\\-1 & 0\\0 & j\end{bmatrix}, \frac{1}{2}\begin{bmatrix}1 & 0\\0 & 1\\-1 & 0\\0 & -j\end{bmatrix},$$

$$\frac{1}{2}\begin{bmatrix}1 & 0\\0 & 1\\j & 0\\0 & 1\end{bmatrix}, \frac{1}{2}\begin{bmatrix}1 & 0\\0 & 1\\j & 0\\0 & -1\end{bmatrix}, \frac{1}{2}\begin{bmatrix}1 & 0\\0 & 1\\j & 0\\0 & j\end{bmatrix}, \frac{1}{2}\begin{bmatrix}1 & 0\\0 & 1\\j & 0\\0 & -j\end{bmatrix},$$

$$\frac{1}{2}\begin{bmatrix}1 & 0\\0 & 1\\-j & 0\\0 & 1\end{bmatrix}, \frac{1}{2}\begin{bmatrix}1 & 0\\0 & 1\\-j & 0\\0 & -1\end{bmatrix}, \frac{1}{2}\begin{bmatrix}1 & 0\\0 & 1\\-j & 0\\0 & j\end{bmatrix}, \frac{1}{2}\begin{bmatrix}1 & 0\\0 & 1\\-j & 0\\0 & -j\end{bmatrix},$$

The rank-2 sixth precoding matrix subset includes the 16 precoding matrices.

When the first precoding matrix set in step 101 is the uplink codebook corresponding to Scenario 2, when a rank is 3, because two transmission layers are transmitted on one of the port groups, a submatrix that includes columns corresponding to the two transmission layers corresponding to the port group and rows including non-zero elements in the two columns is a full-rank matrix. Because a projection 2-norm distance between any two of all orthogonal bases for the full-rank matrix is 0, only one precoding matrix needs to be defined for the port group for transmitting the two transmission layers. Therefore, in a precoding matrix whose rank is 3, one column is a column of a precoding matrix selected from the fifth precoding matrix subset, and the other two columns include columns of two precoding matrices selected from the second precoding matrix subset. Therefore, the following columns included in nonscalar parts of eight precoding matrices may be obtained: [16, 25, 27], [17, 25, 27], [18, 25, 27], [19, 25, 27], [20, 24, 26], [21, 24, 26], [22, 24, 26], and [23, 24, 26].

To ensure that total average power of a corresponding transmission port remains unchanged when a precoding matrix indicated by a TPMI changes, including a rank change, a normalization factor of a precoding matrix whose rank is 3 needs to be ½.

The following eight precoding matrices whose ranks are 3 may be obtained based on the determined normalization factor ½ and columns of precoding matrices in Table 5 that correspond to these precoding matrix sequence numbers:

$$\frac{1}{2}\begin{bmatrix}1 & 0 & 0\\0 & 1 & 0\\1 & 0 & 0\\0 & 0 & 1\end{bmatrix}, \frac{1}{2}\begin{bmatrix}1 & 0 & 0\\0 & 1 & 0\\-1 & 0 & 0\\0 & 0 & 1\end{bmatrix}, \frac{1}{2}\begin{bmatrix}1 & 0 & 0\\0 & 1 & 0\\j & 0 & 0\\0 & 0 & 1\end{bmatrix}, \frac{1}{2}\begin{bmatrix}1 & 0 & 0\\0 & 1 & 0\\-j & 0 & 0\\0 & 0 & 1\end{bmatrix}$$

$$\frac{1}{2}\begin{bmatrix}0 & 1 & 0\\1 & 0 & 0\\0 & 0 & 1\\1 & 0 & 0\end{bmatrix}, \frac{1}{2}\begin{bmatrix}0 & 1 & 0\\1 & 0 & 0\\0 & 0 & 1\\-1 & 0 & 0\end{bmatrix}, \frac{1}{2}\begin{bmatrix}0 & 1 & 0\\1 & 0 & 0\\0 & 0 & 1\\j & 0 & 0\end{bmatrix}, \frac{1}{2}\begin{bmatrix}0 & 1 & 0\\1 & 0 & 0\\0 & 0 & 1\\-j & 0 & 0\end{bmatrix}$$

The rank-3 seventh precoding matrix subset includes the eight precoding matrices.

In addition, when the first precoding matrix set in step 101 is the uplink codebook corresponding to Scenario 2, assuming that an antenna is blocked on the four antenna ports, in other words, AGI occurs, AGI is likely to occur on one dual-polarized antenna pair (in other words, one port group). Based on the assumption, rank-2 transmission can still be performed on the other dual-polarized antenna pair. Based on this, in this application, two precoding matrices are further added to all the precoding matrices whose transmission ranks are 2, to instruct to disable transmission ports included in a same port group.

Specifically, considering the dual-polarized antenna pair assumption corresponding to FIG. 2, two precoding matrices used for port selection may be added to the precoding matrices whose ranks are 2, and columns included in nonscalar parts of the two precoding matrices may be represented as [24, 26] and [25, 27]. The following two precoding matrices may be obtained based on the determined normalization factor ½ and columns of precoding matrices in Table 5 that correspond to these precoding matrix sequence numbers:

$$\frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 0\\0 & 1\end{bmatrix},$$

When the first precoding matrix set in step 101 is the uplink codebook corresponding to Scenario 2, obviously, a precoding matrix whose rank is 4 should also be completely the same as that in Scenario. Therefore, there is one precoding matrix, and a column included in a nonscalar part of the precoding matrix is represented as [24, 25, 26, 27]. The following precoding matrix whose rank is 4 is obtained based on the determined normalization factor ½ and columns of precoding matrices in Table 5 that correspond to these precoding matrix sequence numbers:

$$\frac{1}{2}\begin{bmatrix}1 & 0 & 0 & 0\\0 & 1 & 0 & 0\\0 & 0 & 1 & 0\\0 & 0 & 0 & 1\end{bmatrix}$$

It can be learned that, based on the design, for the case in Scenario 2 in which coherent transmission can be performed only in a port group, if first bit fields are allowed to indicate TRIs and TPMIs of all precoding matrices whose ranks are 1 to 4, there are a total of 12 precoding matrices whose ranks are 1: the precoding matrices whose precoding matrix sequence numbers are 16 to 27 and that are shown in Table 5;

there are a total of 18 precoding matrices whose ranks are 2, and the 18 precoding matrices include the 16 precoding matrices in the sixth precoding matrix subset and two precoding matrices in the eighth precoding matrix subset;

there are a total of eight precoding matrices whose ranks are 3: the eight precoding matrices in the seventh precoding matrix subset; and there is one precoding matrix whose rank is 4.

Therefore, there are a total of 12+18+8+1=39 precoding matrices. If hybrid coding is performed on a TPMI and a TRI, in other words, when the indication information in step 101 includes the first bit field and the first bit field indicates the precoding matrix in the first precoding matrix set and the transmission rank corresponding to the precoding matrix, 6 bits are required in the first bit field for indication.

The indication information in step 101 is indicated to the terminal by using DCI. Considering that there should be as few DCI indication bits as possible to ensure highly reliable decoding on a downlink control channel, removing eight precoding matrices from the 39 precoding matrices needs to be considered to obtain an uplink codebook including 31 precoding matrices. In this case, only 5 bits are required to indicate the TPMI and the TRI.

An implementation, provided in this application, of removing eight precoding matrices from the 39 precoding matrices includes the following implementation options:

Implementation option 1: Eight precoding matrices are removed from the 16 precoding matrices in the rank-2 sixth precoding matrix subset.

Considering that exhaustion of all phase combinations makes overheads high when a rank is 2, eight precoding matrices may be removed from the 16 precoding matrices.

Optionally, to keep consistent with the LTE-A uplink codebook, phases of two dual-polarized pairs come from different orthogonal phase combinations for each precoding matrix remaining from the 16 precoding matrices whose ranks are 2.

Therefore, columns included in nonscalar parts of remaining eight precoding matrices may be represented as [16, 22], [16, 23], [17, 22], [17, 23], [18, 20], [18, 21], [19, 20], and [19, 21]. The remaining eight precoding matrices are as follows:

$$\frac{1}{2}\begin{bmatrix}1&0\\0&1\\1&0\\0&j\end{bmatrix}, \frac{1}{2}\begin{bmatrix}1&0\\0&1\\1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\-1&0\\0&-j\end{bmatrix},$$

$$\frac{1}{2}\begin{bmatrix}1&0\\0&1\\j&0\\0&1\end{bmatrix}, \frac{1}{2}\begin{bmatrix}1&0\\0&1\\j&0\\0&-1\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix}, \frac{1}{2}\begin{bmatrix}1&0\\0&1\\1&0\\0&j\end{bmatrix}$$

is used as an example. A transmit phase difference between the port 1 and the port 3 is different from a transmit phase difference between the port 2 and the port 4, and therefore, a phase of a dual-polarized pair corresponding to the port 1 and the port 3 and a phase of a dual-polarized pair corresponding to the port 2 and the port 4 come from different orthogonal phase combinations.

Correspondingly, phases of two dual-polarized pairs corresponding to each of eight precoding matrices removed from the 16 precoding matrices whose ranks are 2 come from a same orthogonal phase combination.

For example, columns included in nonscalar parts of the removed eight precoding matrices may be represented as [16, 20], [16, 21], [17, 20], [17, 21], [18, 22], [18, 23], [19, 22], and [19, 23], and the removed eight precoding matrices are as follows:

$$\frac{1}{2}\begin{bmatrix}1&0\\0&1\\1&0\\0&1\end{bmatrix}, \frac{1}{2}\begin{bmatrix}1&0\\0&1\\1&0\\0&-1\end{bmatrix}, \frac{1}{2}\begin{bmatrix}1&0\\0&1\\-1&0\\0&1\end{bmatrix}, \frac{1}{2}\begin{bmatrix}1&0\\0&1\\-1&0\\0&-1\end{bmatrix},$$

$$\frac{1}{2}\begin{bmatrix}1&0\\0&1\\j&0\\0&j\end{bmatrix}, \frac{1}{2}\begin{bmatrix}1&0\\0&1\\j&0\\0&-j\end{bmatrix}, \frac{1}{2}\begin{bmatrix}1&0\\0&1\\-j&0\\0&j\end{bmatrix}, \frac{1}{2}\begin{bmatrix}1&0\\0&1\\-j&0\\0&-j\end{bmatrix}$$

Implementation option 2: Four precoding matrices are removed from the 16 precoding matrices in the rank-2 sixth precoding matrix subset, and four precoding matrices are removed from the eight precoding matrices in the rank-3 seventh precoding matrix subset.

For example, the four precoding matrices removed from the rank-2 sixth precoding matrix are four precoding matrices that meet the following conditions: Phases of two dual-polarized pairs come from a same orthogonal phase combination, and a transmit phase difference is not a BPSK phase difference. The four precoding matrices may be represented as [18, 22], [18, 23], [19, 22], and [19, 23]. The removed four precoding matrices are as follows:

$$\frac{1}{2}\begin{bmatrix}1&0\\0&1\\j&0\\0&j\end{bmatrix}, \frac{1}{2}\begin{bmatrix}1&0\\0&1\\j&0\\0&-j\end{bmatrix}, \frac{1}{2}\begin{bmatrix}1&0\\0&1\\-j&0\\0&j\end{bmatrix}, \frac{1}{2}\begin{bmatrix}1&0\\0&1\\-j&0\\0&-j\end{bmatrix}$$

The four precoding matrices removed from the rank-3 seventh precoding matrix are four precoding matrices that meet the following conditions: For transmission layers of two ports in one transmission port, in other words, for columns in the fifth precoding matrix subset, a transmit phase difference is not a BPSK phase difference. The four precoding matrices may be represented as [18, 25, 27], [19, 25, 27], [22, 24, 26], and [23, 24, 26]. The removed four precoding matrices are as follows:

$$\frac{1}{2}\begin{bmatrix}1&0&0\\0&1&0\\j&0&0\\0&0&1\end{bmatrix}, \frac{1}{2}\begin{bmatrix}1&0&0\\0&1&0\\-j&0&0\\0&0&1\end{bmatrix}, \frac{1}{2}\begin{bmatrix}0&1&0\\1&0&0\\0&0&1\\j&0&0\end{bmatrix}, \frac{1}{2}\begin{bmatrix}0&1&0\\1&0&0\\0&0&1\\-j&0&0\end{bmatrix}$$

For a solution of the implementation option 1 for optimizing a quantity of precoding matrices, this application provides an optimized first precoding matrix set in Scenario 2, including the following:

When there is one transmission data stream, that is, a rank is 1, for 12 precoding matrices whose ranks are 1, refer to the precoding matrices whose precoding matrix sequence numbers are 16 to 27 in Table 5.

When there are two transmission data streams, that is, a rank is 2, for 10 precoding matrices whose ranks are 2, refer to Table 9. The 10 precoding matrices include eight precoding matrices (whose precoding matrix sequence numbers are 0 to 7 in Table 9) in the sixth precoding matrix subset and the two precoding matrices (whose precoding matrix sequence numbers are 8 and 9 in Table 9) in the eighth precoding matrix.

When there are three transmission data streams, that is, a rank is 3, for eight precoding matrices whose ranks are 3, refer to Table 10. The eight precoding matrices include the eighth precoding matrices (whose precoding matrix sequence numbers are 0 to 7 in Table 10) in the seventh precoding matrix subset.

When there are four transmission data streams, that is, a rank is 4, for one precoding matrix whose rank is 4, refer to Table 8.

Based on the design, there are a total of 12+10+8+1=31 precoding matrices in the uplink codebook corresponding to Scenario 2, and only 5 bits are required for indication if hybrid coding is performed on the TPMI and the TRI.

TABLE 9

| Precoding matrix sequence number | Two transmission data streams | | | |
|---|---|---|---|---|
| 0-3 | $\frac{1}{2}\begin{bmatrix}1&0\\0&1\\1&0\\0&j\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\-1&0\\0&j\end{bmatrix}$ | $\frac{1}{2}\begin{bmatrix}1&0\\0&1\\-1&0\\0&-j\end{bmatrix}$ |
| 4-7 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ |
| 8-9 | $\frac{1}{2}\begin{bmatrix}1&0\\0&0\\0&1\\0&0\end{bmatrix}$ | $\frac{1}{2}\begin{bmatrix}0&0\\1&0\\0&0\\0&1\end{bmatrix}$ | — | — |

TABLE 10

| Precoding matrix sequence number | Three transmission data streams | | | |
|---|---|---|---|---|
| 0-3 | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2}\begin{bmatrix}1&0&0\\0&1&0\\j&0&0\\0&0&1\end{bmatrix}$ | $\frac{1}{2}\begin{bmatrix}1&0&0\\0&1&0\\-j&0&0\\0&0&1\end{bmatrix}$ |
| 4-7 | $\frac{1}{2}\begin{bmatrix}0&1&0\\1&0&0\\0&0&1\\1&0&0\end{bmatrix}$ | $\frac{1}{2}\begin{bmatrix}0&1&0\\1&0&0\\0&0&1\\-1&0&0\end{bmatrix}$ | $\frac{1}{2}\begin{bmatrix}0&1&0\\1&0&0\\0&0&1\\j&0&0\end{bmatrix}$ | $\frac{1}{2}\begin{bmatrix}0&1&0\\1&0&0\\0&0&1\\-j&0&0\end{bmatrix}$ |

Optionally, when the four transmission ports are classified into the first port group and the second port group, in the third implementation scenario of the foregoing embodiment, the terminal supports an incoherent transmission state of the four transmission ports, to be specific, coherent transmission cannot be performed in the first port group, in the second port group, or between the first port group and the second port group. Correspondingly, the first precoding matrix set in step 101 is an uplink codebook corresponding to Scenario 3.

When the first precoding matrix set in step 101 is the uplink codebook corresponding to Scenario 3, correspondingly, a precoding matrix whose transmission rank is 1 and a precoding matrix whose transmission rank is greater than 1 that are included in the first precoding matrix set in step 101 have the following characteristics:

All the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

This application provides the following solution for the uplink codebook designed in Scenario 3:

When there is one transmission data stream, that is, a rank is 1, a total of four precoding matrices: precoding matrices corresponding to precoding matrix sequence numbers 24 to 27 in Table 5 are used as precoding matrices whose ranks are 1. A column of each of the four precoding matrices includes one non-zero element and three zero elements, non-zero elements included in all of the four precoding matrices are located in different rows, and transmit power of a transmission port corresponding to a row including the zero element is 0.

When there are two transmission data streams, that is, a rank is 2, a nonscalar part of each precoding matrix whose rank is 2 includes two columns, and the two columns include all combinations of columns of two precoding matrices randomly selected from four precoding matrices whose ranks are 1. Obtained six precoding matrices may be represented as [24, 26], [25, 27], [24, 25], [26, 27], [24, 27], and [25, 26]. For the obtained six precoding matrices, refer to precoding matrices corresponding to precoding matrix sequence numbers 0 to 5 in Table 11.

When there are three transmission data streams, that is, a rank is 3, a nonscalar part of each precoding matrix whose rank is 3 includes three columns, and the three columns include all combinations of columns of three precoding matrices randomly selected from four precoding matrices whose ranks are 1. Obtained four precoding matrices may be represented as [24, 25, 26], [24, 25, 27], [24, 26, 27], and [25, 26, 27]. For the obtained four precoding matrices, refer to precoding matrices corresponding to precoding matrix sequence numbers 0 to 3 in Table 12.

When there are four transmission data streams, that is, a rank is 4, for one precoding matrix whose rank is 4, refer to Table 8.

Based on the design, there are a total of 4+6+4+1=15 precoding matrices in the uplink codebook corresponding to Scenario 3, and only 4 bits are required for indication if hybrid coding is performed on the TPMI and the TRI.

In addition, in an optional embodiment, a scalar part of each of precoding matrices in all tables in all the foregoing embodiments may be 1. In this case, the base station receives a power headroom (power headroom, PHR) report to learn a power control headroom of the terminal.

In this application, for three different scenarios related to coherent transmission, a simplified uplink codebook that can ensure low downlink signaling indication overheads and better performance is designed. A precoding matrix whose rank is greater than 1 in the uplink codebook may be obtained by concatenating precoding matrices whose ranks are 1, so that implementation complexity of the terminal can be reduced. In comparison with the prior art, no additional RRC signaling overheads are required to indicate a CBSR.

In comparison with a prior-art uplink codebook that uses a DFT-S-OFDM waveform and that is applied to LTE-A, in codebook designs in cases of a rank 2 and a rank 3 in this application, three different scenarios are considered, and a precoding matrix is generated by performing column extraction on MUBs, so as to maximize a minimum precoding matrix spacing and improve performance.

In comparison with a prior-art uplink codebook that uses a DFT-S-OFDM waveform and that is applied to NR, the precoding matrix design in this application is simplified and compact, so that DCI indication overheads can be minimized, and no RRC signaling overheads are required to indicate a CBSR.

A universal uplink transmission scenario is considered in this application, so that a minimum precoding matrix spacing can be maximized, and DCI signaling indication overheads can be reduced. In addition, for all scenarios, when an antenna is blocked, two precoding matrices are added to precoding matrices whose ranks are 2, so as to disable a radio frequency link of a blocked transmission port.

TABLE 11

| Precoding matrix sequence number | Two transmission data streams | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 0 \\ 0 & 1 \end{bmatrix}$ |
| 4-5 | $\frac{1}{2}\begin{bmatrix} 0 & 0 \\ 1 & 0 \\ 0 & 1 \\ 0 & 0 \end{bmatrix}$ | $\frac{1}{2}\begin{bmatrix} 0 & 0 \\ 0 & 0 \\ 1 & 0 \\ 0 & 1 \end{bmatrix}$ | — | — |

TABLE 12

| Precoding matrix sequence number | Three transmission data streams | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 0 & 0 & 0 \\ 0 & 0 & 1 \end{bmatrix}$ | $\frac{1}{2}\begin{bmatrix} 1 & 0 & 0 \\ 0 & 0 & 0 \\ 0 & 1 & 0 \\ 0 & 0 & 1 \end{bmatrix}$ | $\frac{1}{2}\begin{bmatrix} 0 & 0 & 0 \\ 1 & 0 & 0 \\ 0 & 1 & 0 \\ 0 & 0 & 1 \end{bmatrix}$ |

Figure 3:
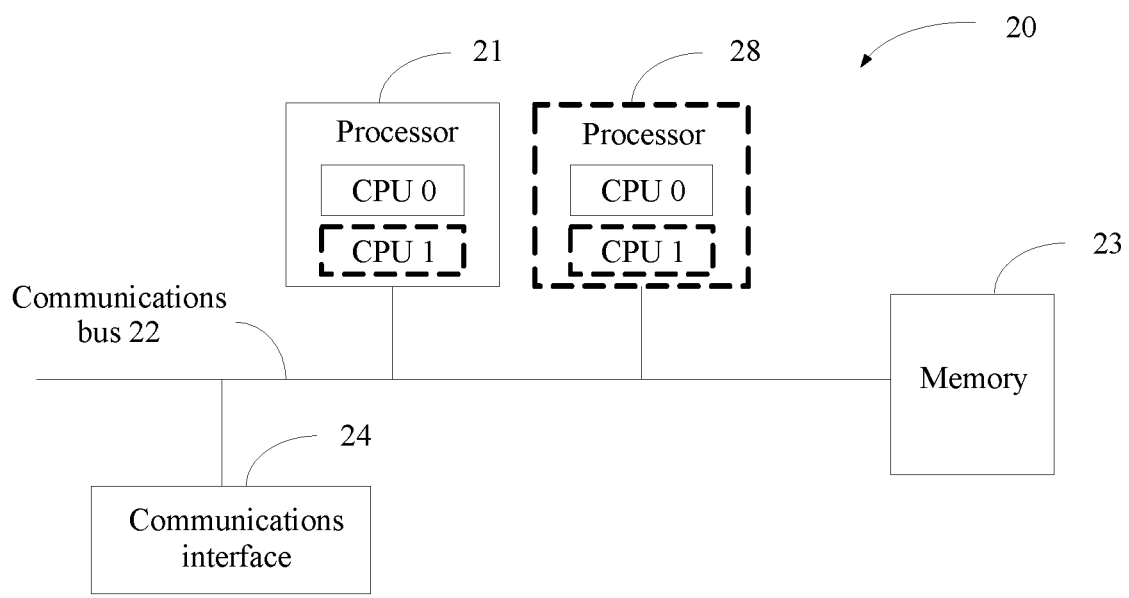
FIG. 3 is a schematic structural diagram of an apparatus according to this application.

Based on a same invention concept, as shown in FIG. 3, an embodiment of this application provides an apparatus 20, including at least one processor 21, a communications bus 22, a memory 23, and at least one communications interface 24.

For example, the terminal 200 in FIG. 2 may be the apparatus 20 shown in FIG. 3. The apparatus 20 may implement terminal-related steps in the communication method in the embodiments of this application by using the processor 21.

For example, the base station 100 in FIG. 2 may be the apparatus 20 shown in FIG. 3. The apparatus 20 may implement base station-related steps in the communication method in the embodiments of this application by using the processor 21.

The processor 21 may be a general-purpose central processing unit (CPU), a microprocessor, an application-specific integrated circuit (application-specific integrated circuit, ASIC), or one or more integrated circuits for controlling program execution of the solution in this application.

The communications bus 22 may include a path for transmitting information between the foregoing components. The communications interface 24 is configured to use any transceiver apparatus to communicate with another device or a communications network, such as Ethernet, a radio access network (RAN), or a WALN.

The memory 23 may be a read-only memory (read-only memory, ROM) or another type of static storage device that can store static information and an instruction, or a random access memory (random access memory, RAM) or another type of dynamic storage device that can store information and an instruction; or may be an electrically erasable programmable read-only memory (electrically erasable programmable read-only memory, EEPROM), a compact disc read-only memory (compact disc read-only memory, CD-ROM), or another compact disc storage, an optical disc storage (including a compact disc, a laser disc, an optical disc, a digital versatile disc, a Blu-ray disc, or the like), or a disk storage medium or another magnetic storage device, or any other medium that can be used to carry or store expected program code in an instruction or data structure form and that can be accessed by the apparatus. However, this is not limited herein. The memory may exist independently and is connected to the processor by using the bus. Alternatively, the memory may be integrated with the processor.

The memory 23 is configured to store application program code for executing the solution of this application, and execution of the application program code is controlled by the processor 21. The processor 21 is configured to execute the application program code stored in the memory 23.

During specific implementation, in an embodiment, the processor 21 may include one or more CPUs such as a CPU 0 and a CPU 1 in FIG. 3.

During specific implementation, in an embodiment, the apparatus 20 may include a plurality of processors such as a processor 21 and a processor 28 in FIG. 28. Each of the processors may be a single-core (single-CPU) processor, or may be a multi-core (multi-CPU) processor. The processor herein may be one or more devices, circuits, and/or processing cores configured to process data (for example, a computer program instruction).

In this embodiment of this application, function modules of the apparatus shown in FIG. 3 may be obtained through division based on the foregoing method examples. For example, each function module may be obtained through division based on each function, or two or more functions may be integrated into one processing module. The integrated module may be implemented in a form of hardware, or may be implemented in a form of a software function module. It should be noted that the module division in this embodiment of this application is an example, and is merely logical function division and may be another division manner during actual implementation.

In this embodiment, the apparatus shown in FIG. 3 is presented by obtaining, through division, each function module corresponding to each function, or the apparatus is presented by obtaining each function module through division in an integrated manner. The "module" herein may be an application-specific integrated circuit (application-specific integrated circuit, ASIC), a circuit, a processor that executes one or more software programs or firmware programs, a memory, an integrated logic circuit, and/or another component that can provide the foregoing function.

Figure 4:
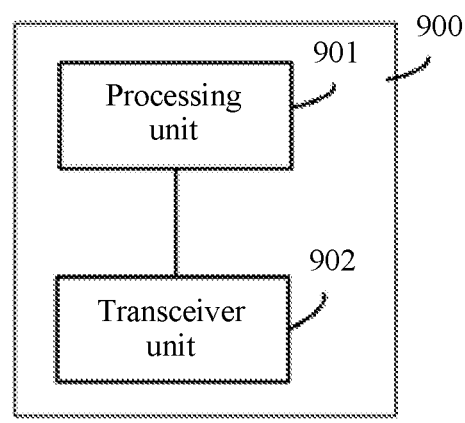
FIG. 4 is a schematic structural diagram of another apparatus according to this application.

For example, if each function module is obtained through division based on each function, FIG. 4 is a possible schematic structural diagram of the apparatus in the foregoing embodiment. The apparatus 900 may be the terminal or the base station in the foregoing embodiment. The apparatus 900 includes a processing unit 901 and a transceiver unit 902. The transceiver unit 902 is used by the processing unit 901 to receive and send a signal. A method performed by the processing unit 901 in FIG. 4 may be implemented by using the processor 21 (and/or the processor 28) and the memory 23 in FIG. 3. Specifically, the method performed by the processing unit 901 may be performed by using the processor 21 (and/or the processor 28) in FIG. 3 by invoking application program code stored in the memory 23. This is not limited in this embodiment of this application.

During specific implementation, when the apparatus 900 may be the terminal in the foregoing embodiment, the transceiver unit 902 is configured to receive indication information from the base station, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, $1 \leq r \leq N$, and a value of the transmission rank is equal to the quantity r of transmission layers; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and the processing unit 901 is configured to determine, based on the indication information, the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of 1, −1, j, and −j.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

During specific implementation, when the apparatus 900 may be the base station in the foregoing embodiment, the processing unit 901 is configured to determine indication information, where the indication information includes a first bit field, the first bit field is used to indicate a precoding matrix included in a first precoding matrix set and a transmission rank corresponding to the precoding matrix, and the precoding matrix is used to precode transmit data streams at r transmission layers to obtain signals to be sent on N transmission ports of the terminal; a quantity of rows of the precoding matrix is equal to the quantity N of transmission ports, and N=4; a quantity of columns of the precoding matrix is equal to the quantity r of transmission layers, 1≤r≤N, and a value of the transmission rank is equal to the quantity r of transmission layers; and when r>1, a nonscalar part of a precoding matrix whose transmission rank is r in the first precoding matrix set is obtained by combining columns in nonscalar parts of r precoding matrices, and the r precoding matrices are precoding matrices selected from all precoding matrices whose transmission ranks are 1; and the transceiver unit 902 is configured to send the indication information to the terminal, where the indication information is used by the terminal to determine the precoding matrix for precoding the transmit data streams at all the transmission layers.

In a possible design, coherent transmission can be performed between the transmission ports;

all the precoding matrices whose transmission ranks are 1 include at least a first precoding matrix subset and a second precoding matrix subset, a column of each precoding matrix in the first precoding matrix subset includes four non-zero elements, the second precoding matrix subset includes four precoding matrices, a column of each of the four precoding matrices includes one non-zero element and three zero elements, the zero element indicates that transmit power of a corresponding transmission port is 0, and non-zero elements included in all of the four precoding matrices are located in different rows;

all precoding matrices whose transmission ranks are 2 include a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix subset;

all precoding matrices whose transmission ranks are 3 include a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices included in the second precoding matrix subset.

In a possible design, the third precoding matrix subset includes any two or three types of a first-type precoding matrix, a second-type precoding matrix, and a third-type precoding matrix, where a first column and a second column of the first-type precoding matrix have completely same beam space but different cross-polarization phases, a first column and a second column of the second-type precoding matrix have opposite beam space but a same cross-polarization phase, and a first column and a second column of the second-type precoding matrix have opposite beam space and different cross-polarization phases.

In a possible design, the transmission ports are classified into a first port group and a second port group, coherent transmission can be performed between the transmission ports, and coherent transmission can be performed in the first port group, in the second port group, and between the first port group and the second port group.

In a possible design, the transmission ports are classified into a first port group and a second port group, and coherent transmission can be performed in the first port group and in the second port group, but coherent transmission cannot be performed between the first port group and the second port group;

all the precoding matrices whose transmission ranks are 1 include a fifth precoding matrix subset and a second precoding matrix subset, a column of each precoding matrix in the fifth precoding matrix subset includes two non-zero elements and two zero elements, a transmission port corresponding to a row including the non-zero element is a transmission port included in the first port group or the second port group, transmit power of a transmission port corresponding to a row including the zero element is 0, the second precoding matrix subset includes four precoding matrices, a column of each of the four precoding matrices includes one non-zero element and three zero elements, and non-zero elements included in all of the four precoding matrices are located in different rows;

all precoding matrices whose transmission ranks are 2 include a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 include a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, all the precoding matrices whose transmission ranks are 2 further include an eighth precoding matrix subset, the eighth precoding matrix subset includes a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row including a non-zero element in the first precoding matrix is a transmission port included in the first port group, and a transmission port corresponding to a row including a non-zero element in the second precoding matrix is a transmission port included in the second port group.

In a possible design, coherent transmission cannot be performed between the transmission ports;

all the precoding matrices whose transmission ranks are 1 include a second precoding matrix subset, the second precoding matrix subset includes four precoding matrices, a column of each of the four precoding matrices includes one non-zero element and three zero elements, non-zero elements included in all of the four precoding matrices are located in different rows, and transmit power of a transmission port corresponding to a row including the zero element is 0;

all precoding matrices whose transmission ranks are 2 include a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 include a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

In a possible design, when coherent transmission can be performed between the transmission ports, the first bit field occupies 7 bits or 6 bits.

In a possible design, when coherent transmission can be performed in the first port group and in the second port group, but coherent transmission cannot be performed between the first port group and the second port group, the first bit field occupies 6 bits or 5 bits.

In a possible design, when coherent transmission cannot be performed between the transmission ports, the first bit field occupies 4 bits.

In a possible design, non-zero elements included in each precoding matrix in the first precoding matrix set include some or all of 1, −1, j, and −j.

In a possible design, a 2-norm of a row including a non-zero element is always ½ in all the precoding matrices in the first precoding matrix set.

In a possible design, two transmission ports included in the first port group correspond to one dual-polarized antenna pair, or two transmission ports included in the first port group correspond to two beams with a same beam direction but vertical polarization directions.

A specific implementation of the foregoing apparatus embodiment corresponds to that of the method embodiment. For the specific implementation and beneficial effects of the apparatus embodiment, refer to related descriptions in the method embodiment.

Figure 5:
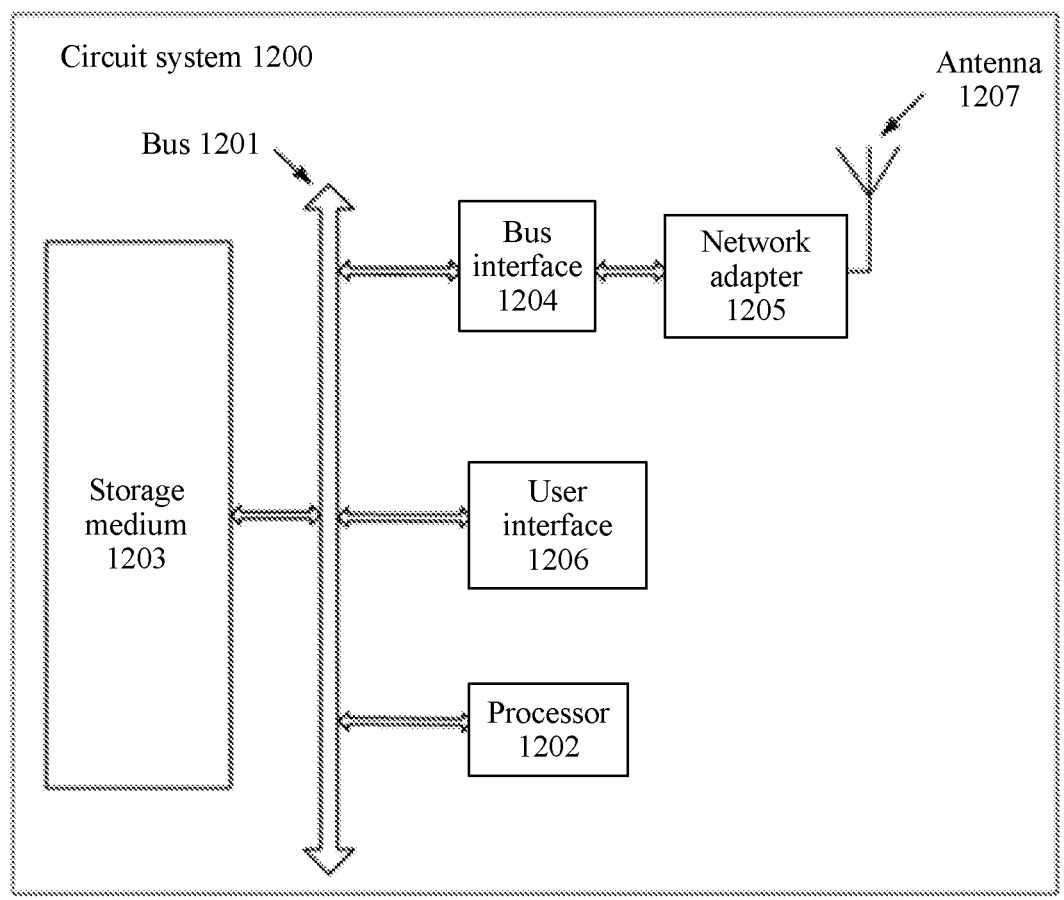
FIG. 5 is a schematic structural diagram of a circuit system according to this application.

Based on a same invention concept, an embodiment of this application further provides a circuit system. FIG. 5 is a schematic structural diagram of a circuit system (for example, a communications apparatus such as an access point, a base station, a site, or a terminal) according to an implementation of the present invention.

As shown in FIG. 5, the circuit system 1200 may be implemented by using a bus 1201 as a general bus architecture. The bus 1201 may include any quantity of interconnected buses and bridges based on specific application and an overall design constraint condition of the circuit system 1200. The bus 1201 connects various circuits together, and these circuits include a processor 1202, a storage medium 1203, and a bus interface 1204. Optionally, in the circuit system 1200, a network adapter 1205 and the like are connected by using the bus 1201 and by using the bus interface 1204. The network adapter 1205 may be configured to implement a signal processing function of a physical layer in a wireless communications network, and send and receive a radio frequency signal by using an antenna 1207. A user interface 1206 may be connected to a user terminal such as a keyboard, a display, a mouse, or a joystick. The bus 1201 may further connect various other circuits such as a timing source, a peripheral device, a voltage regulator, or a power management circuit. These circuits are well-known in the art, and are not described in detail herein.

Alternatively, the circuit system 1200 may be configured as a chip or a system on chip. The chip or the system on chip includes one or more microprocessors that provide a processor function, and an external memory that provides at least a part of the storage medium 1203. All the components are connected to another support circuit by using an external bus architecture.

Alternatively, the circuit system 1200 may be implemented by using an ASIC (application-specific integrated circuit) that includes the processor 1202, the bus interface 1204, and the user interface 1206, and at least a part that is of the storage media 1203 and that is integrated into a single chip. Alternatively, the circuit system 1200 may be implemented by using one or more FPGAs (field programmable gate array), a PLD (programmable logic device), a controller, a state machine, gate logic, a discrete hardware component, any other appropriate circuit, or any combination of circuits that can perform various functions described in the present invention.

The processor 1202 is responsible for managing the bus and general processing (including executing software stored in the storage medium 1203). The processor 1202 may be implemented by using one or more general-purpose processors and/or dedicated processors. Examples of the processors include a microprocessor, a microcontroller, a DSP processor, and other circuits capable of executing software. The software should be broadly construed as representation of instructions, data or any combination thereof regardless of whether the software is referred to as software, firmware, middleware, microcode, hardware description language, or others.

In the following figure, the storage medium 1203 is separated from the processor 1202. However, a person skilled in the art easily understands that the storage medium 1203 or any part thereof may be located outside the circuit system 1200. For example, the storage medium 1203 may include a transmission line, a carrier waveform modulated by using data, and/or a computer product separated from a wireless node. These media are accessible by the processor 1202 by using the bus interface 1204. Alternatively, the storage medium 1203 or any part thereof may be integrated into the processor 1202, for example, may be a cache and/or a general-purpose register.

The processor 1202 may perform an uplink subband precoding matrix indication method in any of the foregoing embodiments of this application, and details are not described herein again.

Figure 6:
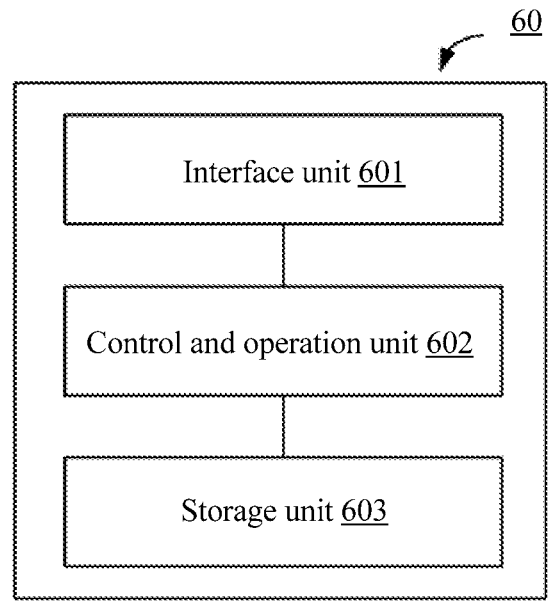
FIG. 6 is a schematic structural diagram of another circuit system according to this application.

FIG. 6 is another schematic structural diagram of a circuit system according to an embodiment of the present invention. The circuit system may be a processor. The processor may be represented as a chip or a system on chip (system on chip, SOC), and is disposed in a base station or a terminal in a wireless communications system in the embodiments of the present invention, so that the base station or the terminal implements the communication method in the embodiments of the present invention. As shown in FIG. 6, the circuit system 60 includes an interface unit 601, a control and operation unit 602, and a storage unit 603. The interface unit is configured to connect to another component of the base station or the terminal, the storage unit 603 is configured to store a computer program or an instruction, and the control and operation unit 602 is configured to decode and execute the computer program or the instruction. It should be understood that the computer program or the instruction may include the foregoing terminal function program, or may include the foregoing base station function program. When the terminal function program is decoded and executed by the control and operation unit 602, the terminal can perform functions of the terminal in an uplink subband precoding matrix indication method in the embodiments of the present invention. When the base station function program is decoded and executed by the control and operation unit 602, the base station can perform functions of the base station in the uplink subband precoding matrix indication method in the embodiments of the present invention.

In a possible design, the terminal function program or the base station function program is stored in a memory outside the circuit system 60. When the terminal function program or the base station function program is decoded and executed by the control and operation unit 602, the storage unit 603 temporarily stores some or all content of the terminal function program, or temporarily stores some or all content of the base station function program.

In another optional implementation, the terminal function program or the base station function program is set to be stored in the storage unit 603 in the circuit system 60. When the storage unit 603 in the circuit system 60 stores the terminal function program, the circuit system 60 may be disposed in the terminal 200 in the wireless communications system in the embodiments of the present invention. When the storage unit 603 in the circuit system 60 stores the base station function program, the circuit system 60 may be disposed in the base station 100 in the wireless communications system in the embodiments of the present invention.

In still another optional implementation, some content of the terminal function program or the base station function program is stored in a memory outside the circuit system 60, and other content of the terminal function program or the base station function program is stored in the storage unit 603 in the circuit system 60.

Based on a same concept, this application provides a computer readable storage medium. The computer readable storage medium stores an instruction, and when the instruction runs on a computer, the computer performs the terminal-related method steps in various embodiments of this application.

Based on a same concept, this application provides a computer readable storage medium. The computer readable storage medium stores an instruction, and when the instruction runs on a computer, the computer performs the base station-related method steps in various embodiments of this application.

Based on a same concept, this application provides a computer program product that includes an instruction, and when the instruction runs on a computer, the computer performs the terminal-related method steps in various embodiments of this application.

Based on a same concept, this application provides a computer program product that includes an instruction, and when the instruction runs on a computer, the computer performs the base station-related method steps in various embodiments of this application.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions described in the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

A person skilled in the art may clearly understand that, for descriptions of the embodiments provided by the present invention, refer to each other. For ease and brevity of description, for functions of the apparatuses and devices and performed steps provided in the embodiments of the present invention, refer to related descriptions in the method embodiments of the present invention, and details are not described herein again.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another single unit may implement several functions listed in the claims. The fact that some measures are recited in mutually different dependent claims does not indicate that a combination of these measures cannot bring better effects.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems" herein. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may be distributed in another form, for example, by using the Internet or another wired or wireless telecommunications system.

A person skilled in the art can further understand that, the various illustrative logical blocks (illustrative logical block) and the steps (step) listed in the embodiments of this application may be implemented through e-mail, computer software, or a combination of the two. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. For each specific application, a person skilled in the art may use various methods to implement the functions. However, this implementation should not be understood to go beyond the protection scope of the embodiments of the present invention.

The various illustrative logical blocks, modules, and circuits described in the embodiments of this application may implement or operate the described functions by using a general-purpose processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general-purpose processing unit may be a microprocessing unit. Optionally, the general-purpose processing unit may be any conventional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

In one or more example designs, the functions described in the embodiments of the present invention may be implemented by using hardware, software, firmware, or any combination thereof. If the present invention is implemented by software, these functions may be stored in a computer readable medium or are transmitted to the computer readable medium in a form of one or more instructions or code. The computer readable medium is either a computer storage medium or a communications medium that enables a computer program to move from one place to another. The storage medium may be an available medium that may be accessed by any general-purpose or special computer. For example, such a computer readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processing unit. In addition, any connection may be appropriately defined as a computer readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer readable medium. The disc (disk) and the disk (disc) include a compressed disk, a laser disk, an optical disc, a DVD, a floppy disk, and a Blu-ray disc. The disc generally copies data by a magnetic means, and the disc generally copies data optically by a laser means. The foregoing combination may also be included in the computer readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A communication method, comprising:
   receiving, by a terminal, indication information sent by a base station, wherein the indication information comprises a first bit field, wherein the first bit field is used to indicate a precoding matrix comprised in a first precoding matrix set and a transmission rank corresponding to the precoding matrix, and wherein the precoding matrix is used to precode transmit data streams at r transmission layers to obtain signals to be sent on N transmission ports of the terminal; wherein a quantity of rows of the precoding matrix is equal to N, and wherein N=4; wherein a quantity of columns of the precoding matrix is equal to r, wherein 1≤r≤N, and wherein a value of the transmission rank is equal to r; and wherein when r>1, a nonscalar part of a precoding matrix whose transmission rank is r in the first precoding matrix set is obtained by combining columns in nonscalar parts of r precoding matrices, and wherein the r precoding matrices are precoding matrices selected from all precoding matrices whose transmission ranks are 1; and
   determining, by the terminal and based on the indication information, the precoding matrix for precoding the transmit data streams at all the transmission layers.

2. The method according to claim 1, wherein coherent transmission can be performed between the transmission ports;
   all the precoding matrices whose transmission ranks are 1 comprise at least a first precoding matrix subset and a second precoding matrix subset, a column of each precoding matrix in the first precoding matrix subset comprises four non-zero elements, the second precoding matrix subset comprises four precoding matrices, a column of each of the four precoding matrices comprises one non-zero element and three zero elements, the zero element indicates that transmit power of a corresponding transmission port is 0, and non-zero elements comprised in all of the four precoding matrices are located in different rows;
   all precoding matrices whose transmission ranks are 2 comprise a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix sub set;
   all precoding matrices whose transmission ranks are 3 comprise a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and
   a nonscalar part of a precoding matrix whose transmission rank is 4 is obtained by combining columns in nonscalar parts of four precoding matrices, and the four precoding matrices are all the precoding matrices comprised in the second precoding matrix subset.

3. The method according to claim 2, wherein:
   the third precoding matrix subset comprises any two or three types of a first-type precoding matrix, a second-type precoding matrix, and a third-type precoding matrix, wherein a first column and a second column of the first-type precoding matrix have completely same beam space but different cross-polarization phases, wherein a first column and a second column of the second-type precoding matrix have opposite beam space but a same cross-polarization phase, and wherein a first column and a second column of the second-type precoding matrix have opposite beam space and different cross-polarization phases.

4. The method according to claim 2, wherein the transmission ports are classified into a first port group and a second port group, wherein coherent transmission can be performed between the transmission ports, and wherein coherent transmission can be performed in the first port group, in the second port group, and between the first port group and the second port group.

5. The method according to claim 1, wherein the transmission ports are classified into a first port group and a second port group, and coherent transmission can be performed in the first port group and in the second port group, but coherent transmission cannot be performed between the first port group and the second port group;
   all the precoding matrices whose transmission ranks are 1 comprise a fifth precoding matrix subset and a second precoding matrix subset, a column of each precoding matrix in the fifth precoding matrix subset comprises two non-zero elements and two zero elements, a transmission port corresponding to a row comprising the non-zero element is a transmission port comprised in the first port group or the second port group, transmit power of a transmission port corresponding to a row comprising the zero element is 0, the second precoding matrix subset comprises four precoding matrices, a column of each of the four precoding matrices comprises one non-zero element and three zero elements, and non-zero elements comprised in all of the four precoding matrices are located in different rows;

all precoding matrices whose transmission ranks are 2 comprise a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 comprise a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

6. The method according to claim 4, wherein:

all the precoding matrices whose transmission ranks are 2 further comprise an eighth precoding matrix subset, the eighth precoding matrix subset comprises a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row comprising a non-zero element in the first precoding matrix is a transmission port comprised in the first port group, and a transmission port corresponding to a row comprising a non-zero element in the second precoding matrix is a transmission port comprised in the second port group.

7. The method according to claim 1, wherein coherent transmission cannot be performed between the transmission ports;

all the precoding matrices whose transmission ranks are 1 comprise a second precoding matrix subset, the second precoding matrix subset comprises four precoding matrices, a column of each of the four precoding matrices comprises one non-zero element and three zero elements, non-zero elements comprised in all of the four precoding matrices are located in different rows, and transmit power of a transmission port corresponding to a row comprising the zero element is 0;

all precoding matrices whose transmission ranks are 2 comprise a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 comprise a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

8. A communication method, comprising:

determining, by a base station, indication information, wherein the indication information comprises a first bit field, wherein the first bit field is used to indicate a precoding matrix comprised in a first precoding matrix set and a transmission rank corresponding to the precoding matrix, and wherein the precoding matrix is used to precode transmit data streams at r transmission layers to obtain signals to be sent on N transmission ports of a terminal; wherein a quantity of rows of the precoding matrix is equal to N, and wherein N=4; wherein a quantity of columns of the precoding matrix is equal to r, wherein $1 \leq r \leq N$, and wherein a value of the transmission rank is equal to r; and wherein when r>1, a nonscalar part of a precoding matrix whose transmission rank is r in the first precoding matrix set is obtained by combining columns in nonscalar parts of r precoding matrices, and wherein the r precoding matrices are precoding matrices selected from all precoding matrices whose transmission ranks are 1; and sending, by the base station, the indication information to the terminal, wherein the indication information is used by the terminal to determine the precoding matrix for precoding the transmit data streams at all the transmission layers.

9. The method according to claim 8, wherein coherent transmission can be performed between the transmission ports;

all the precoding matrices whose transmission ranks are 1 comprise at least a first precoding matrix subset and a second precoding matrix subset, a column of each precoding matrix in the first precoding matrix subset comprises four non-zero elements, the second precoding matrix subset comprises four precoding matrices, a column of each of the four precoding matrices comprises one non-zero element and three zero elements, the zero element indicates that transmit power of a corresponding transmission port is 0, and non-zero elements comprised in all of the four precoding matrices are located in different rows;

all precoding matrices whose transmission ranks are 2 comprise a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix sub set;

all precoding matrices whose transmission ranks are 3 comprise a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices comprised in the second precoding matrix subset.

10. The method according to claim 9, wherein:
the third precoding matrix subset comprises any two or three types of a first-type precoding matrix, a second-type precoding matrix, and a third-type precoding matrix, wherein a first column and a second column of the first-type precoding matrix have completely same beam space but different cross-polarization phases, wherein a first column and a second column of the second-type precoding matrix have opposite beam space but a same cross-polarization phase, and wherein a first column and a second column of the second-type precoding matrix have opposite beam space and different cross-polarization phases.

11. The method according to claim 9, wherein the transmission ports are classified into a first port group and a second port group, wherein coherent transmission can be performed between the transmission ports, and wherein coherent transmission can be performed in the first port group, in the second port group, and between the first port group and the second port group.

12. The method according to claim 8, wherein the transmission ports are classified into a first port group and a second port group, and coherent transmission can be performed in the first port group and in the second port group, but coherent transmission cannot be performed between the first port group and the second port group;

all the precoding matrices whose transmission ranks are 1 comprise a fifth precoding matrix subset and a second precoding matrix subset, a column of each precoding matrix in the fifth precoding matrix subset comprises two non-zero elements and two zero elements, a transmission port corresponding to a row comprising the non-zero element is a transmission port comprised in the first port group or the second port group, transmit power of a transmission port corresponding to a row comprising the zero element is 0, the second precoding matrix subset comprises four precoding matrices, a column of each of the four precoding matrices comprises one non-zero element and three zero elements, and non-zero elements comprised in all of the four precoding matrices are located in different rows;

all precoding matrices whose transmission ranks are 2 comprise a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 comprise a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

13. The method according to claim 11, wherein:
all the precoding matrices whose transmission ranks are 2 further comprise an eighth precoding matrix subset, the eighth precoding matrix subset comprises a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row comprising a non-zero element in the first precoding matrix is a transmission port comprised in the first port group, and a transmission port corresponding to a row comprising a non-zero element in the second precoding matrix is a transmission port comprised in the second port group.

14. The method according to claim 8, wherein coherent transmission cannot be performed between the transmission ports;

all the precoding matrices whose transmission ranks are 1 comprise a second precoding matrix subset, the second precoding matrix subset comprises four precoding matrices, a column of each of the four precoding matrices comprises one non-zero element and three zero elements, non-zero elements comprised in all of the four precoding matrices are located in different rows, and transmit power of a transmission port corresponding to a row comprising the zero element is 0;

all precoding matrices whose transmission ranks are 2 comprise a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 comprise a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

15. A terminal, comprising at least one processor and a communications interface, wherein:
the communications interface is configured to receive indication information from a base station, wherein the indication information comprises a first bit field, wherein the first bit field is used to indicate a precoding matrix comprised in a first precoding matrix set and a transmission rank corresponding to the precoding matrix, and wherein the precoding matrix is used to precode transmit data streams at r transmission layers to obtain signals to be sent on N transmission ports of the terminal; wherein a quantity of rows of the precoding matrix is equal to N, and wherein N=4; wherein a quantity of columns of the precoding matrix is equal to r, wherein 1≤r≤N, and wherein a value of the transmission rank is equal to r; and wherein when r>1, a nonscalar part of a precoding matrix whose transmission rank is r in the first precoding matrix set is obtained by combining columns in nonscalar parts of r precoding matrices, and wherein the r precoding matrices are precoding matrices selected from all precoding matrices whose transmission ranks are 1; and the at least one processor is configured to determine, based on the indication information, the precoding matrix for precoding the transmit data streams at all the transmission layers.

16. The terminal according to claim 15, wherein coherent transmission can be performed between the transmission ports;

all the precoding matrices whose transmission ranks are 1 comprise at least a first precoding matrix subset and a second precoding matrix subset, a column of each precoding matrix in the first precoding matrix subset comprises four non-zero elements, the second precoding matrix subset comprises four precoding matrices, a column of each of the four precoding matrices comprises one non-zero element and three zero elements, the zero element indicates that transmit power of a corresponding transmission port is 0, and non-zero elements comprised in all of the four precoding matrices are located in different rows;

all precoding matrices whose transmission ranks are 2 comprise a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix sub set;

all precoding matrices whose transmission ranks are 3 comprise a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices comprised in the second precoding matrix subset.

17. The terminal according to claim 16, wherein:

the third precoding matrix subset comprises any two or three types of a first-type precoding matrix, a second-type precoding matrix, and a third-type precoding matrix, wherein a first column and a second column of the first-type precoding matrix have completely same beam space but different cross-polarization phases, wherein a first column and a second column of the second-type precoding matrix have opposite beam space but a same cross-polarization phase, and wherein a first column and a second column of the second-type precoding matrix have opposite beam space and different cross-polarization phases.

18. The terminal according to claim 16, wherein the transmission ports are classified into a first port group and a second port group, wherein coherent transmission can be performed between the transmission ports, and wherein coherent transmission can be performed in the first port group, in the second port group, and between the first port group and the second port group.

19. The terminal according to claim 15, wherein the transmission ports are classified into a first port group and a second port group, and coherent transmission can be performed in the first port group and in the second port group, but coherent transmission cannot be performed between the first port group and the second port group;

all the precoding matrices whose transmission ranks are 1 comprise a fifth precoding matrix subset and a second precoding matrix subset, a column of each precoding matrix in the fifth precoding matrix subset comprises two non-zero elements and two zero elements, a transmission port corresponding to a row comprising the non-zero element is a transmission port comprised in the first port group or the second port group, transmit power of a transmission port corresponding to a row comprising the zero element is 0, the second precoding matrix subset comprises four precoding matrices, a column of each of the four precoding matrices comprises one non-zero element and three zero elements, and non-zero elements comprised in all of the four precoding matrices are located in different rows;

all precoding matrices whose transmission ranks are 2 comprise a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 comprise a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

20. The terminal according to claim 18, wherein:

all the precoding matrices whose transmission ranks are 2 further comprise an eighth precoding matrix subset, the eighth precoding matrix subset comprises a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row comprising a non-zero element in the first precoding matrix is a transmission port comprised in the first port group, and a transmission port corresponding to a row comprising a non-zero element in the second precoding matrix is a transmission port comprised in the second port group.

21. The terminal according to claim 15, wherein coherent transmission cannot be performed between the transmission ports; and all the precoding matrices whose transmission ranks are 1 comprise a second precoding matrix subset, the second precoding matrix subset comprises four precoding matrices, a column of each of the four precoding matrices comprises one non-zero element and three zero elements, non-zero elements comprised in all of the four precoding matrices are located in different rows, and transmit power of a transmission port corresponding to a row comprising the zero element is 0;

all precoding matrices whose transmission ranks are 2 comprise a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 comprise a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

22. A base station, comprising at least one processor and a communications interface, wherein:

the at least one processor is configured to determine indication information, wherein the indication information comprises a first bit field, wherein the first bit field is used to indicate a precoding matrix comprised in a first precoding matrix set and a transmission rank corresponding to the precoding matrix, and wherein the precoding matrix is used to precode transmit data streams at r transmission layers to obtain signals to be sent on N transmission ports of a terminal; wherein a quantity of rows of the precoding matrix is equal to N, and wherein N=4; wherein a quantity of columns of the precoding matrix is equal to r, wherein 1≤r≤N, and wherein a value of the transmission rank is equal to r; and wherein when r>1, a nonscalar part of a precoding matrix whose transmission rank is r in the first precoding matrix set is obtained by combining columns in nonscalar parts of r precoding matrices, and wherein the r precoding matrices are precoding matrices selected from all precoding matrices whose transmission ranks are 1; and the communications interface is configured to send the indication information to the terminal, wherein the indication information is used by the terminal to determine the precoding matrix for precoding the transmit data streams at all the transmission layers.

23. The base station according to claim 22, wherein coherent transmission can be performed between the transmission ports;

all the precoding matrices whose transmission ranks are 1 comprise at least a first precoding matrix subset and a second precoding matrix subset, a column of each precoding matrix in the first precoding matrix subset comprises four non-zero elements, the second precoding matrix subset comprises four precoding matrices, a column of each of the four precoding matrices comprises one non-zero element and three zero elements, the zero element indicates that transmit power of a corresponding transmission port is 0, and non-zero elements comprised in all of the four precoding matrices are located in different rows;

all precoding matrices whose transmission ranks are 2 comprise a third precoding matrix subset, a nonscalar part of each precoding matrix in the third precoding matrix subset is obtained by combining columns in nonscalar parts of two precoding matrices, and the two precoding matrices are two mutually orthogonal precoding matrices selected from the first precoding matrix sub set;

all precoding matrices whose transmission ranks are 3 comprise a fourth precoding matrix subset, a nonscalar part of each precoding matrix in the fourth precoding matrix subset is obtained by combining columns in nonscalar parts of three precoding matrices, and the three precoding matrices are three mutually orthogonal precoding matrices selected from the first precoding matrix subset; and a nonscalar part of a precoding matrix whose transmission rank is 4 is obtained by combining columns in nonscalar parts of four precoding matrices, and the four precoding matrices are all the precoding matrices comprised in the second precoding matrix subset.

24. The base station according to claim 23, wherein:

the third precoding matrix subset comprises any two or three types of a first-type precoding matrix, a second-type precoding matrix, and a third-type precoding matrix, wherein a first column and a second column of the first-type precoding matrix have completely same beam space but different cross-polarization phases, wherein a first column and a second column of the second-type precoding matrix have opposite beam space but a same cross-polarization phase, and wherein a first column and a second column of the second-type precoding matrix have opposite beam space and different cross-polarization phases.

25. The base station according to claim 23, wherein the transmission ports are classified into a first port group and a second port group, wherein coherent transmission can be performed between the transmission ports, and wherein coherent transmission can be performed in the first port group, in the second port group, and between the first port group and the second port group.

26. The base station according to claim 22, wherein the transmission ports are classified into a first port group and a second port group, and coherent transmission can be performed in the first port group and in the second port group, but coherent transmission cannot be performed between the first port group and the second port group;

all the precoding matrices whose transmission ranks are 1 comprise a fifth precoding matrix subset and a second precoding matrix subset, a column of each precoding matrix in the fifth precoding matrix subset comprises two non-zero elements and two zero elements, a transmission port corresponding to a row comprising the non-zero element is a transmission port comprised in the first port group or the second port group, transmit power of a transmission port corresponding to a row comprising the zero element is 0, the second precoding matrix subset comprises four precoding matrices, a column of each of the four precoding matrices comprises one non-zero element and three zero elements, and non-zero elements comprised in all of the four precoding matrices are located in different rows;

all precoding matrices whose transmission ranks are 2 comprise a sixth precoding matrix subset, a nonscalar part of each precoding matrix in the sixth precoding matrix subset is obtained by combining columns in nonscalar parts of two precoding matrices, and the two precoding matrices are two precoding matrices selected from the fifth precoding matrix subset;

all precoding matrices whose transmission ranks are 3 comprise a seventh precoding matrix subset, a nonscalar part of each precoding matrix in the seventh precoding matrix subset is obtained by combining columns in nonscalar parts of three precoding matrices, one of the three precoding matrices is a precoding matrix selected from the fifth precoding matrix subset, and the other two of the three precoding matrices are two precoding matrices selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

27. The base station according to claim 25, wherein:

all the precoding matrices whose transmission ranks are 2 further comprise an eighth precoding matrix subset, the eighth precoding matrix subset comprises a first precoding matrix and a second precoding matrix, a nonscalar part of the first precoding matrix and a nonscalar part of the second precoding matrix each are obtained by combining columns in nonscalar parts of two precoding matrices, the two precoding matrices are precoding matrices selected from the second precoding matrix subset, a transmission port corresponding to a row comprising a non-zero element in the first precoding matrix is a transmission port comprised in the first port group, and a transmission port corresponding to a row comprising a non-zero element in the second precoding matrix is a transmission port comprised in the second port group.

28. The base station according to claim 22, wherein coherent transmission cannot be performed between the transmission ports;

all the precoding matrices whose transmission ranks are 1 comprise a second precoding matrix subset, the second precoding matrix subset comprises four precoding matrices, a column of each of the four precoding matrices comprises one non-zero element and three zero elements, non-zero elements comprised in all of the four precoding matrices are located in different rows, and transmit power of a transmission port corresponding to a row comprising the zero element is 0;

all precoding matrices whose transmission ranks are 2 comprise a ninth precoding matrix subset, a nonscalar part of each precoding matrix in the ninth precoding matrix subset is obtained by combining columns in nonscalar parts of two precoding matrices, and the two precoding matrices are two precoding matrices randomly selected from the second precoding matrix subset;

all precoding matrices whose transmission ranks are 3 comprise a tenth precoding matrix subset, a nonscalar part of each precoding matrix in the tenth precoding matrix subset is obtained by combining columns in nonscalar parts of three precoding matrices, and the three precoding matrices are three precoding matrices randomly selected from the second precoding matrix subset; and a nonscalar part of a precoding matrix whose transmission rank is 4 is obtained by combining columns in nonscalar parts of four precoding matrices, and the four precoding matrices are all the precoding matrices in the second precoding matrix subset.

\* \* \* \* \*

UNITED STATES PATENT AND TRADEMARK OFFICE
CERTIFICATE OF CORRECTION

PATENT NO. : 10,911,125 B2  
APPLICATION NO. : 16/461315  
DATED : February 2, 2021  
INVENTOR(S) : Yanliang Sun and Kai Xu Page 1 of 1

It is certified that error appears in the above-identified patent and that said Letters Patent is hereby corrected as shown below:

In the Claims

In Column 56, Line 26, In Claim 2, delete "sub set;" and insert --subset;--, therefor.

In Column 58, Line 67, In Claim 9, delete "sub set;" and insert --subset;--, therefor.

In Column 61, Line 41, In Claim 16, delete "sub set;" and insert --subset;--, therefor.

In Column 64, Line 15, In Claim 23, delete "sub set;" and insert --subset;--, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*